United States Patent
Yeh et al.

(10) Patent No.: US 6,323,844 B1
(45) Date of Patent: Nov. 27, 2001

(54) CURSOR CONTROLLING DEVICE AND THE METHOD OF THE SAME

(76) Inventors: Fu-Kuo Yeh, 3rd Fl., No. 2, Hou-Kang St., Shih-Lin Dist.; Mei-Yun Chen, 3rd, No. 2, Lane 42, Hou-Knag St., Shin-Lin Dist., both of Taipei (TW)

( * ) Notice: Subject to any disclaimer, the term of this patent is extended or adjusted under 35 U.S.C. 154(b) by 0 days.

(21) Appl. No.: 08/908,098

(22) Filed: Aug. 11, 1997

(51) Int. Cl.$^7$ ...................................................... G09G 5/00
(52) U.S. Cl. .......................... 345/166; 345/184; 345/163
(58) Field of Search .................................... 345/157, 160, 345/184, 161, 166, 167, 163

(56) References Cited

U.S. PATENT DOCUMENTS

| | | | |
|---|---|---|---|
| 4,521,772 | * | 6/1985 | Lyon ..................................... 345/166 |
| 4,670,743 | * | 6/1987 | Zemke ................................. 345/167 |
| 4,935,728 | * | 6/1990 | Kley ..................................... 345/161 |
| 5,195,179 | * | 3/1993 | Tokunaga ............................. 345/159 |
| 5,196,838 | * | 3/1993 | Meier et al. ......................... 345/118 |
| 5,293,158 | * | 3/1994 | Soma ..................................... 345/161 |
| 5,488,392 | * | 1/1996 | Harris ..................................... 345/157 |
| 5,686,937 | * | 11/1997 | LI ......................................... 345/123 |
| 5,704,037 | * | 12/1997 | Chen ..................................... 345/184 |
| 5,760,764 | * | 6/1998 | Martinelli ............................. 345/160 |
| 5,874,956 | * | 2/1999 | LaHood ................................. 345/339 |

\* cited by examiner

Primary Examiner—Steven Saras
Assistant Examiner—Fritz Alphonse
(74) Attorney, Agent, or Firm—Bacon & Thomas

(57) ABSTRACT

A cursor controlling device and the method thereof, the moving and positioning of the cursor on the computer display are controlled by said cursor controlling device through a controlling circuit, wherein said cursor controlling device is comprised of a case, an information carrier set, a reading set and a sliding bar set, wherein the information carriers are located on the same plane in parallel or are serially connected within the proper position of said case and they are overlapped with each other, another, each of the information carriers has a driving portion for being driven by said sliding bar set, and when said driving portions of the information carriers are serially connected and overlapped with each other, they may be installed internal or external the case. Besides, in the cursor control method of the present invention, there are two operating mode on the control circuit, wherein in the first operation mode, the movement of a finger controllable element is detected, and then the cursor is moved correspondingly; in the second operation mode, a virtual pointer area is installed so that as the finger controllable element is moved into this area, it is automatically converted into the operation of specified instruction to perform a bidirectional movement containing at least a scrolling operation, or it may be separated specially to increase a function in which the cursor may arrive at the boundry of hte virtual display, thus the moving area of said control device may be design within an area about 0.5 inch, and it may be mapped into the whole display by absolute coordinate. Besides, it has further space for programming the function of automatic scrolling and arriving at the boundary fast.

21 Claims, 26 Drawing Sheets

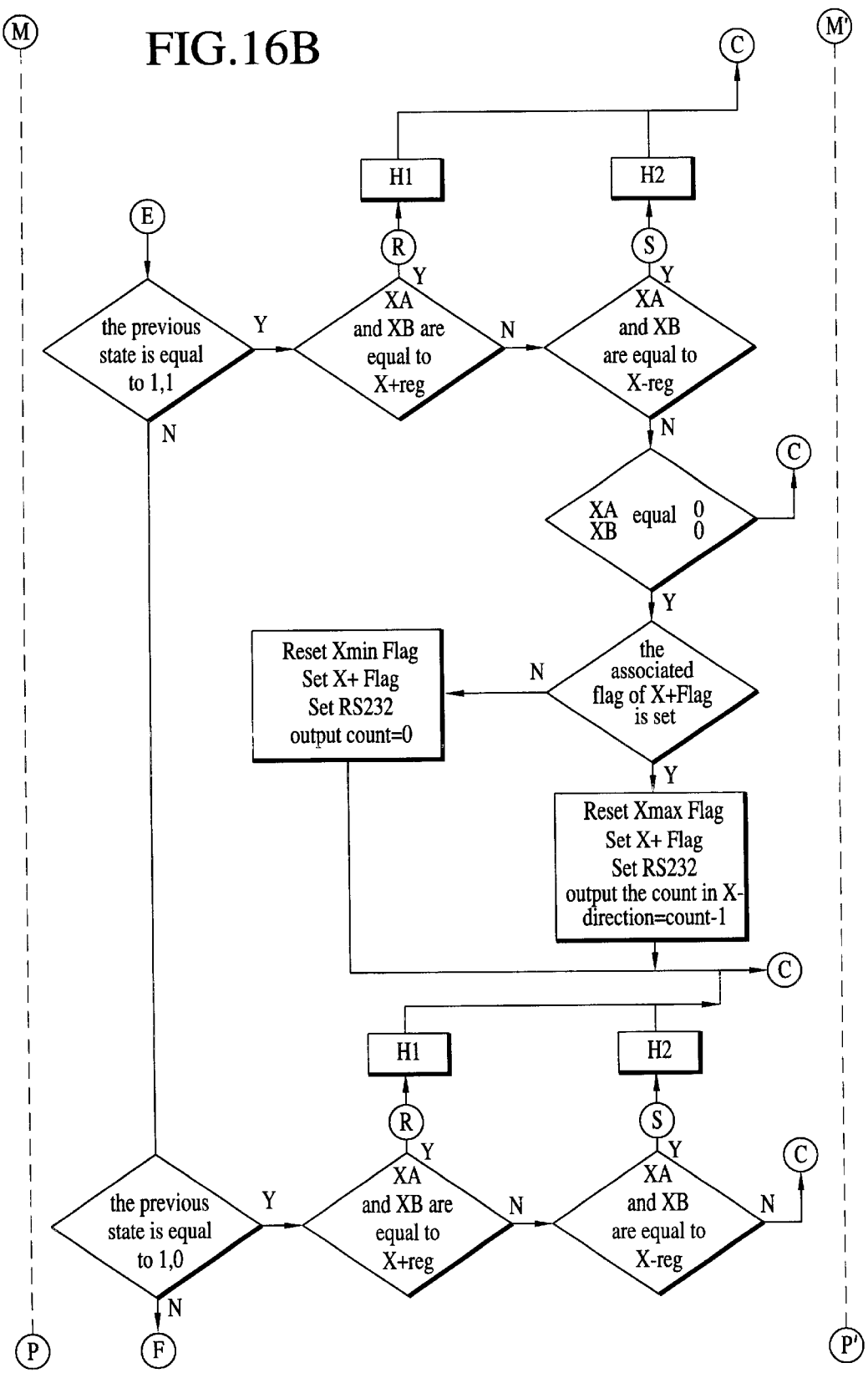

CURSOR CONTROLLING DEVICE AND THE METHOD OF THE SAME

BACKGROUND OF THE INVENTION

1. Field of the Invention

The present invention relates to a cursor controlling device and the method of the same, especially to a cursor controlling device which may be installed on a wireless remote controller, and said controller may be operated by thumb so to match the requirement of ergonomics, in the present invention, the moving range of the cursor controlling device is within a range of approximate 0.5 inch, and the operation may be mapped to the whole screen by using an absolute coordinate method (pixel to pixel), besides, there is also space for programming the operation of automatic scrolling and performing the function of fast arriving at the boundary, another the present invention may be used in mouses, keyboards, remote controllers and the operating panel of a notebook computer.

2. Description of the Prior Art

Since the current computer software is more and more perfect, the operation space of the user will not be confined with a single screen. More and more software is equipped with virtual display and they are widely used, such as in the environment of Window 95 and Intel surveyor that has used the virtual display screen. Accordingly, the prior mouse has not suited to use in these brand-new environment, Since in the normal operation the virtual display screen is larger than the practical screen with 9–12 times. Especially, the operation is more apparently when it is used in the Intel surveyor. Since the prior mouse is moved slowly so it will not match the requirement of the surveyor, thus a technology for installing a scrolling key is generated, such as U.S. Pat. No. 5,539,455, wherein the designed z axis is used to scroll the virtual display, in operation, the z axis is rotated continuously by the finger; or U.S. Pat. No. 4,782,328, wherein a finger controllable element is applied to resist against the right and left boundaries to the upper and lower boundaries, thus the virtual display will move leftwards and rightwards, or upwards and downwards, and according to the retaining time that the finger controllable element will resist against the boundaries to increase the scrolling speed. However the drawback of such a design is that as the reversing scrolling is performed each time, the cursor must move across the display to another boundary, thus the operation need too much time and has no efficiency. In another design, the middle key of the mouse is clicked to generate a global instruction so to move the whole display. In performing, the middle key is clicked to convert into the operation of scrolling display, and a further clicking will cause the operation to return to the operation of controlling the movement of cursor. Therefore, in using these prior art, the finger must rotate a rolling wheel of click the keys continuously, this is not a convenient operation, and will not match the increasing requirement of current software.

Further, in the prior art, the position is detected by a rolling ball or a coded wheel, thus when some softwares are performed, it is possible that the cursor will drift and is not easy to position and it is often needed to move the mouse by hand. Afterward U.S. Pat. Nos. 4,782,327 and 4,935,728 discloses an absolute coordinate controlling method to roughly solve the cursor controlling in coordinate. However, the structure in these designs is larger, and they must match with a complicated flow diagram and circuit interface so to attain the object of cursor controlling, thus in practice, it still has some disadvantages needed to be improved.

As shown in FIG. 1, U.S. Pat. No. 4,935,728 has disclosed an absolute coordinate structure, since in which the X axis and Y axis optic grid pieces are shifted transversely and straightly and a sufficient distance is needed for the readable bright and dark lattices. In the structure, the X axis and Y axis are moved within a fixed track, for example, if being pushed tranversely, they are pointed to X axis, and if being pushed upwards or downwards, they are pointed to Y axis, thus in usage, the structure must be positioned in the right position for matching the operation of human hand. Once in operation, if the structure is shifted and the human hand is not shift correspondingly, then if a hand is purely moved along X axis, then it is possible that the cursor does not moved along X axis, in practice the cursor is moved along an inclined line between X axis and Y axis. This will make a ridiculous error in operation.

Another, in the firmware design, as the finger controllable element is performed the absolute coordinate movement, it is attained by two operation modes. As shown in FIG. 1, when the cursor is moved with a low speed v1, there is a fine operation mode in which a fine displacement may be obtained form the absolute position on the display (pixel by pixel), while if the cursor is moved with a high speed v2, the display distance with respectively to each bright and dark lattice is obtained from dividing the surplus distance beside the fine operation mode by the surplus bright and dark lattices beside the movement of optic grid pieces. However, this design is possible that the resultant value will not be an integer so to be inconvenient in calculation, moreover, such a structure is not used in all kinds of display, i.e., the different hardware is needed to match with different resolution, otherwise, in operation, the cursor will jump apparently. For example, a 320 points absolute coordinate structure is applied to a 640 points display, then the cursor will only move one half of the display, and in the boundary the front 310 points, the cursor will directly jump to another boundary of said screen, thus the cursor will not be positioned. Similarly, if the structure is used in an 800 or 1280 points display, the defect is more apparent. Therefore, in order to overcome such a problem, it is needed to enlarge the original structure, but this will further increase the volume of original structure which has occupied a large volume, thus the operate will become further inconvenient. Consequently, in such design, different resolution will match with different structure, the generality is poor and it is not accepted by the users.

Moreover, if this prior absolute structure is used to perform said scrolling of virtual display, it is very inefficient. In operation, the cursor must run across the display to the boundary for scrolling if a right scrolling is needed to be performed, the cursor must again move across the display to the rightmost side, otherwise, if a left scrolling is needed to be performed, the cursor must again move across the display to the original side. As a whole, the process waste too much time and has a poor efficiency.

SUMMARY OF THE INVENTION

Accordingly, in view of the drawbacks in the prior cursor control device, the inventor of the present invention has invented a brand-new cursor controlling device through further studying and experiments.

In the cursor controlling device and the method of the present invention, in which the cursor controlling device is used to control the displacement and location of a cursor on the computer display, the structure thereof may be generally used in all kinds of information carriers, such as optic grid pieces, magnetic disks, magnetic tapes, optic disks, touch pads, optic shift reflector, etc. or the combination of said media described above matched with the related reading set, which has well employed nowadays application technology. However, in order to be conveniently describe the present invention, an optic pieces are discussed as an example, thus components and processing of the present invention will be detailly described.

The cursor controlling device is comprised of: a case which is comprised of a an upper piece and a lower piece, a cavity being installed therebetween; a optic grid set within said case and having at least two optic grids, so to match the two dimensional movement of X axis and Y-axis; an optic sensing set within said case and having at least two sensor sets with respectively to said optic grid pieces for reading the bright and dark messages; a sliding bar set having at least X-axis and Y-axis sensor set for driving said optic grid, respectively, wherein said installed optic grid is serially, or parallelly connected on the proper portion on the container of said case actively, further, each of said optic grid pieces has a driving portion in order to be driven by the respective sliding bar set, and said driven portions as they are serially or parallelly connected may be located internal and external the case. When the driven portion is located within said case, then a notch is installed on the outer surface of said case of passing by the sliding bar set, thereby, the assembled volume of said cursor controlling device may be reduced to a minimum value so to the cursor controlling device may be moved with a very small area to control the movement of cursor moving the display, and said sliding bar set and said optic grid pieces are rotated within a proper angle to fit the operation of human hand. In usage, the cursor controlling device will cause that the shifting from the hand will not effect the cursor so the correct input is always obtained, this is the main object of the present invention.

Besides, the present invention is also related to a cursor controlling device and the method thereof, in which the cursor controlling device is comprised of: a case, namely a finger controllable element; at least two optic grid pieces and at least two sensor set for generating bright and dark signals for reading the message about the movement of said finger controllable element; at least two register for the optic grid pieces to preset the length value of bright and dark signals; and two operative mode, wherein said first operation mode is used to detect the movement of said finger controllable element which may cause the cursor to move respectively on the display; in the second operation mode, a enlarged virtual pointer area so that when the finger controllable element is moved into this enlarged area, it may automatically change to at least specified instruction which may perform a bidirectional movement containing at least one scrolling operation.

The separation of the two operation mode is the compressed boundary respectively installed on the bright and dark lattice of the optic grid pieces. It the finger controllable element is moved within said boundary, the operation is in the first operation mode; otherwise, the operation is in the second operation mode, while the first controllable element is moved into the second operation mode, at least two operation of specified instruction may be performed, one of which is automatically converted into the scrolling of the display screen, and the other operation is to arrive at the virtual screen boundary quickly.

Besides, a further object of the present invention is that the operation may be further programmed so that when the finger controllable element is entered into the boundary of X axis and Y axis from the upper, lower, left, and right directions, the operation is entered into the second operation mode, thus the operation is converted into the scrolling of control rod. If after the finger controllable element has entered into the boundary and then it is moved nearly vertically to the boundary of X axis and Y axis, then the operation is converted into the mode of arriving the boundary quickly. Therefore, by such a design, the present invention may be used in different displays with different resolution, and the operations of scrolling and page changing has preferred effects, thus the converting speed and operation speed of the finger controllable products of the present invention are completely matched with that in the current virtual display software.

These and other objects, features and advantages of the presnet invention will become more apparent from the following description and the appended claims, taken in connection with the accompanying drawings in which preferred embodiment of the present invention are shown by way of illustrative example.

BRIEF DESCRIPTION OF THE DRAWINGS

FIGS. 16A–16I are flow diagrams of the first operation mode in the present invention;

DETAILED DESCRIPTION OF THE PREFERRED EMBODIMENT

Figure 2:
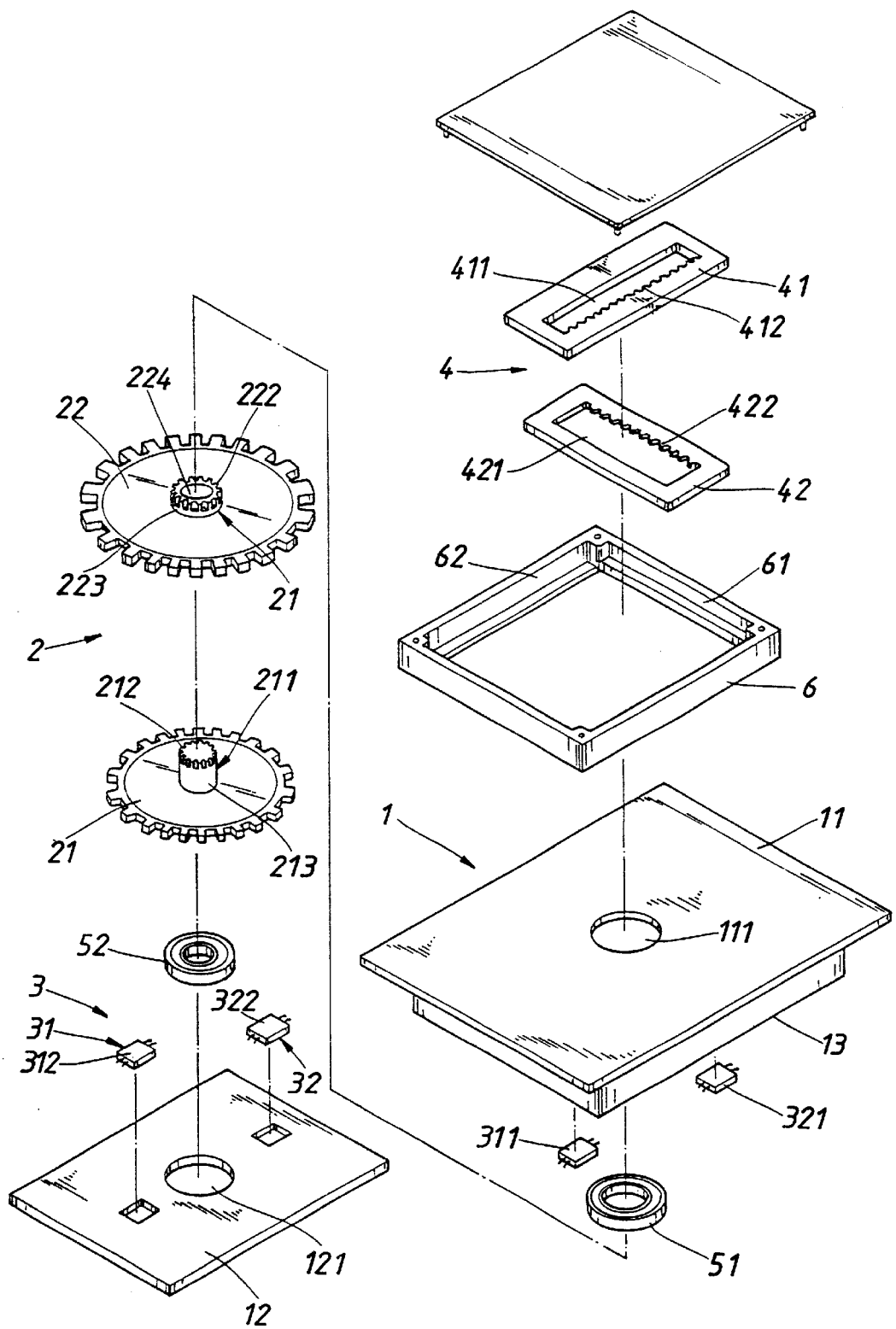
FIG. 2 is an exploded view of the cursor controlling device of the first embodiment in the present invention.
Figure 3:
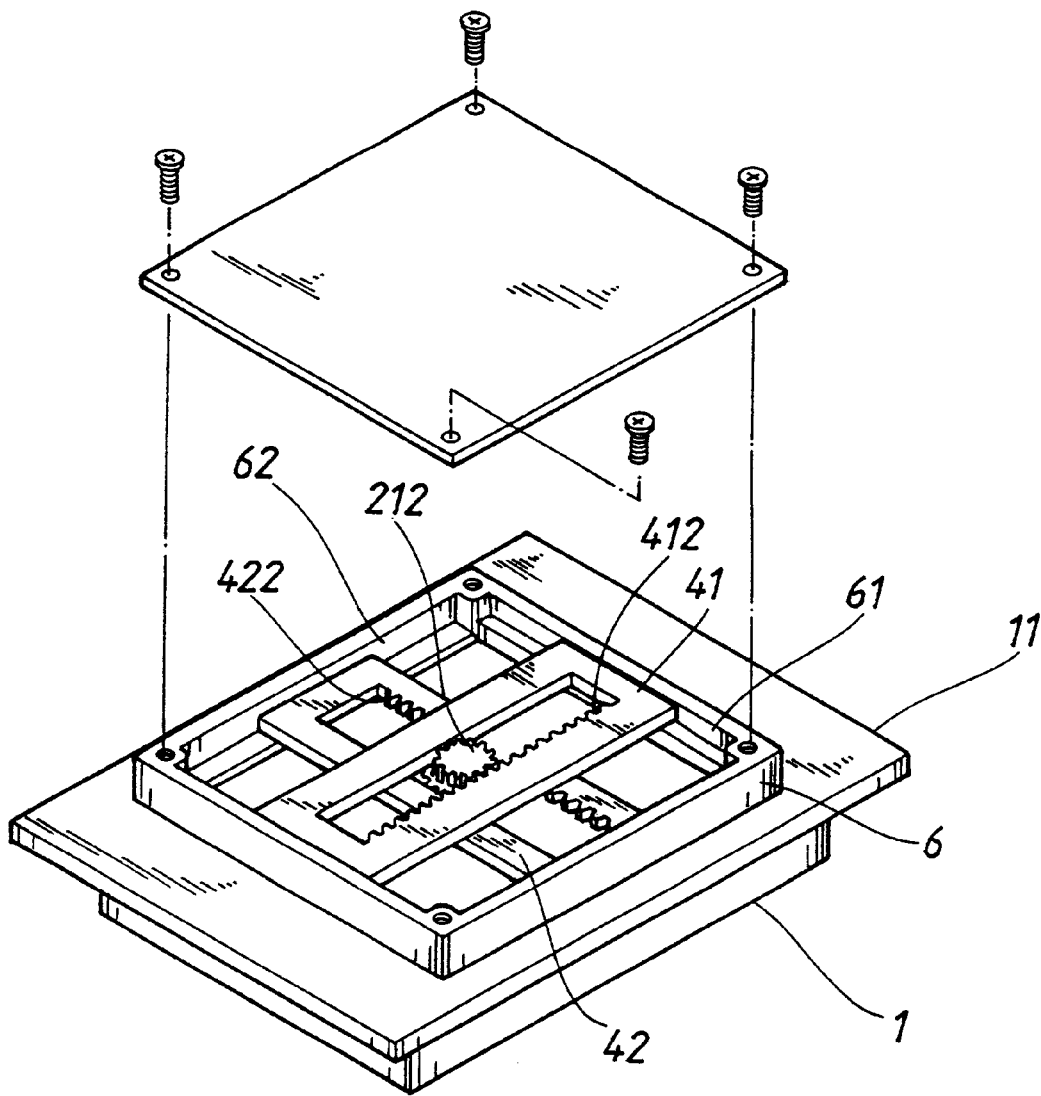
FIG. 3 is an assembly view of the cursor controlling device of the first embodiment in the present invention.
Figure 4:
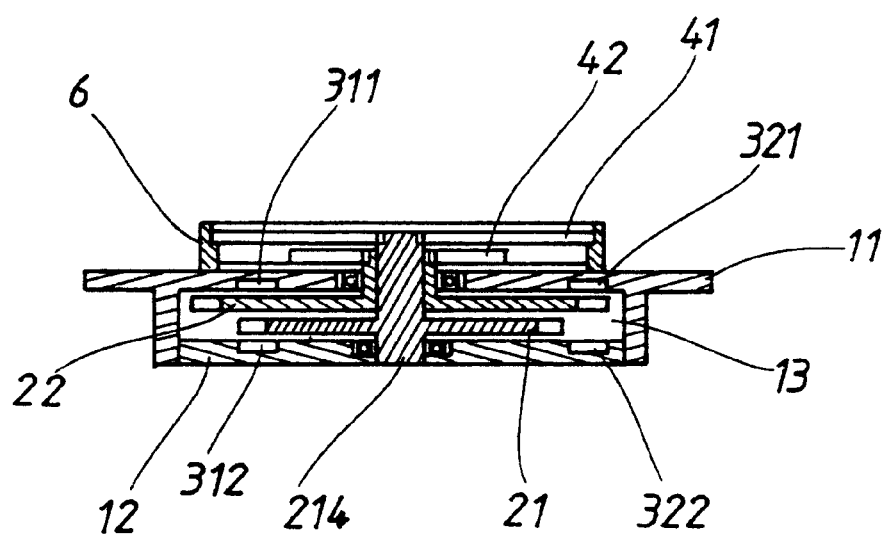
FIG. 4 is an assembly plan view of the cursor controlling device of the first embodiment in the present invention.
Figure 5A:
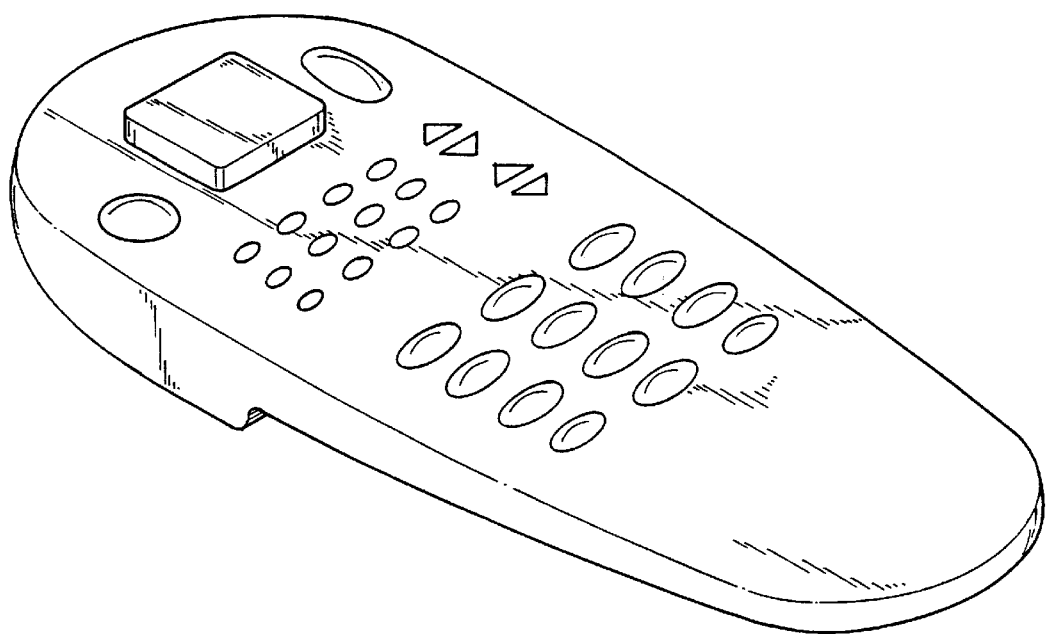
FIGS. 5A and 5B show an embodiment of the present invention used in a remote controller.
Figure 5B:
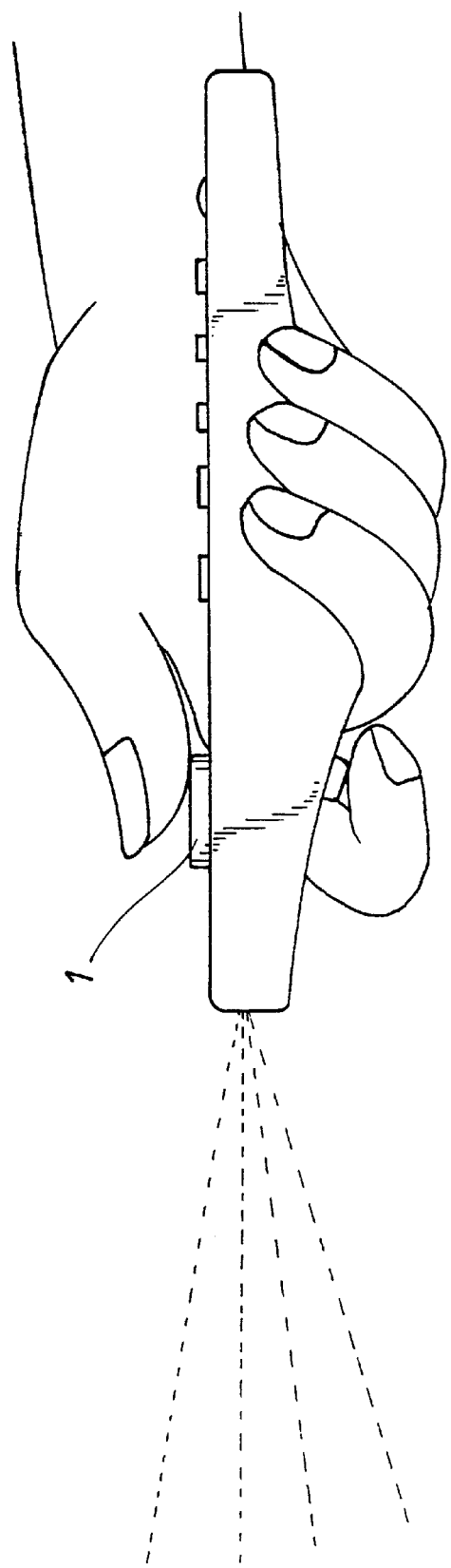
Figure 6:
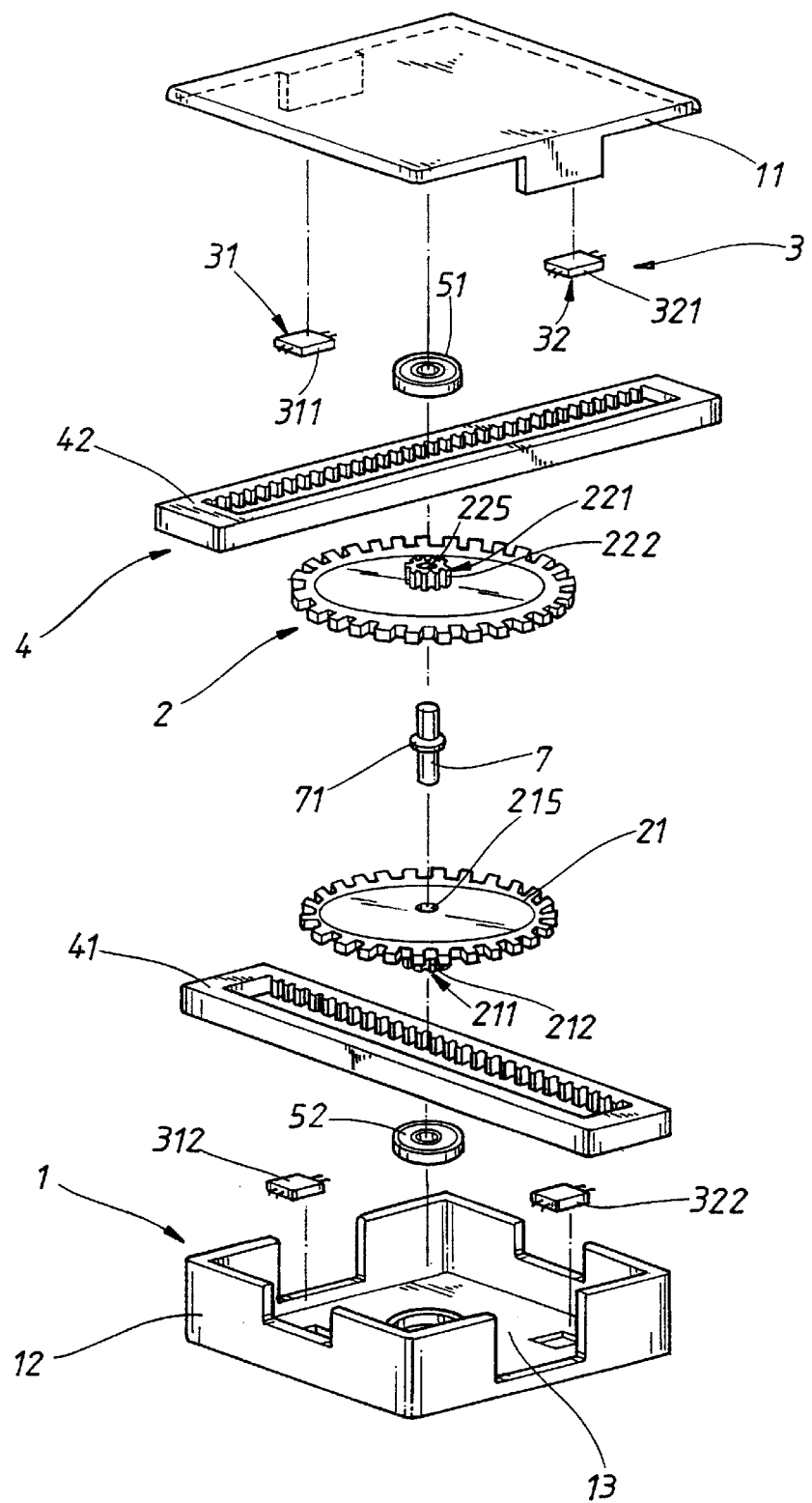
FIG. 6 is an exploded schematic view of the cursor controlling device of the second embodiment in the present invention.
Figure 10:
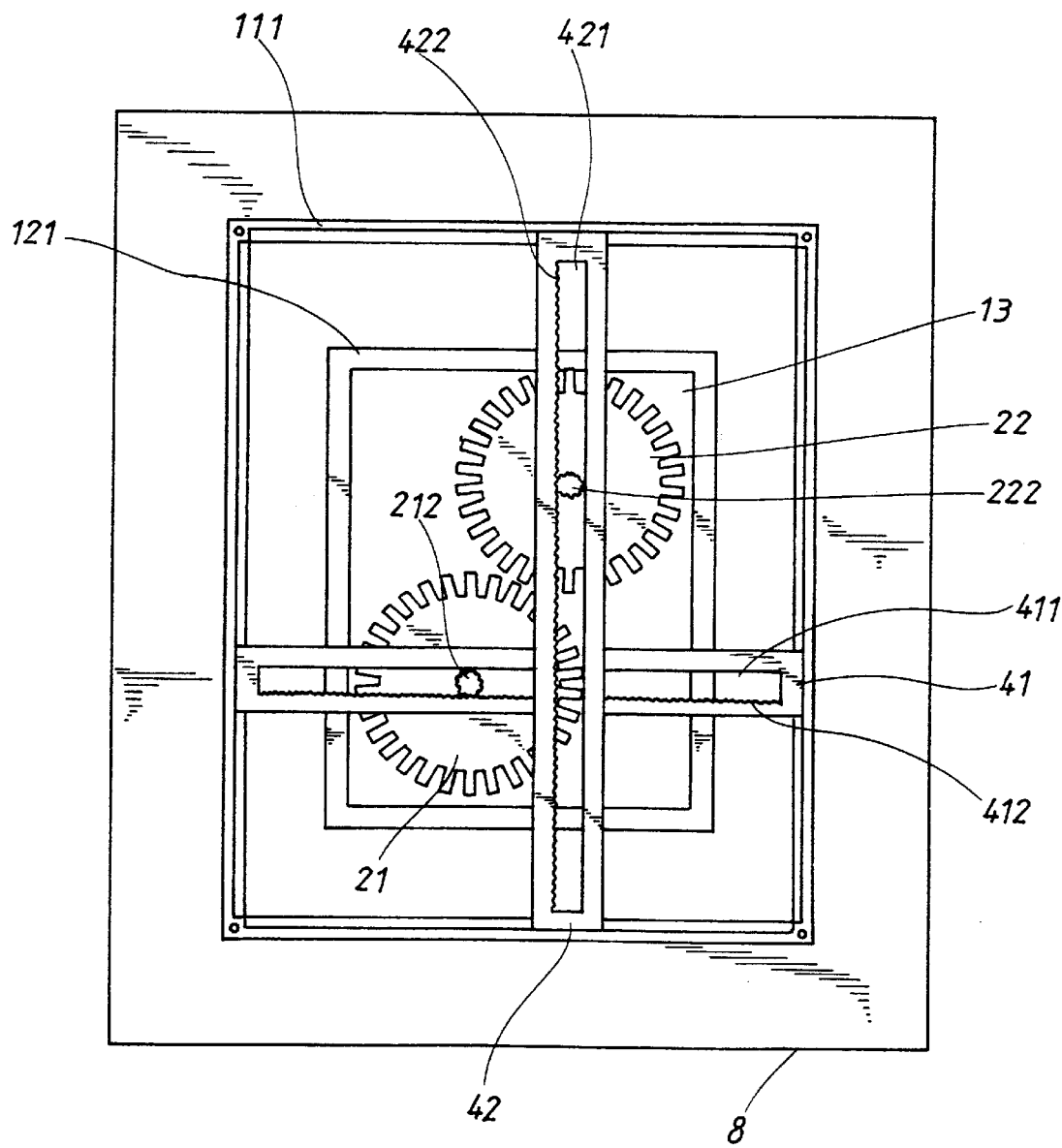
FIG. 10 is a plan view of the cursor controlling device of the third embodiment in the present invention.

Shown in FIGS. 2, 6 and 10 are the cursor controlling device of the present invention and the method thereof. The cursor controlling device may be used in keyboards, mice, remote controller and other manual controlling means. Basically, in said means the case 1 of the cursor controlling device of the present invention is used as a finger controllable element of the means, and the movement and positioning of the cursor on the display may be controlled through a controlling circuit (this is a usually requirement in the generally in the prior art and will not be described). As shown in FIGS. 3, 4 and 5 the cursor controlling device comprises:

- a case 1 which is comprised of an upper piece 11 and a lower piece 12, wherein a concave cavity is installed below said upper piece 11 so that in assembly, the middle part of said the case 1 has a container 13;
- an optic grid set 2 within said case 1 and having at least two optic grids 21 and 22, and a plurality of bright and dark lattices are installed on each of the optic grid pieces 21 and 22, which is sufficient to match the requirement of two dimensional movements of X axis and Y axis;
- An optic sensing set 3 within said case 1 and having at least two sensor sets 31 and 32 each of which has at least an illuminated portion 311 or 312, respectively, and receiving portion 312 and 322, respectively, said two portions are buried on the upper and lower sides of said upper and lower pieces 11 and 12 with respectively to said optic grid pieces 21 and 22 for reading the bright and dark messages;
- A sliding bar set 4 having at least X axis and Y axis sensor set 41 and 42 for driving said optic grid 21 and 22, respectively.
    - wherein the main point of this embodiment is that said installed optic grid is serially connected on the proper portion on the container 13 of said case 1 actively. The optic sensing set 21 and 22 has a circular shape, and the optic grid 21 is installed with a small gear 212 the lower part of which is connected and installed with a long shaft 213, while the other optic grid 22 is installed with a larger gear 222 the lower part of which is connected with a short shaft 223 on the center of which is installed with a through hole 224 for penetrating through by a long shaft 312 installed on said optic grid 21, then the short shaft 214 and short shaft 223 are penetrated through bearings 51 and 52, respectively, so to fix on the penetrating holes 111 and 121 installed on the upper and lower pieces 11 and 12 of said case 1, respectively, for assembling the whole optic grid sets 2. In assembling, the small gear 212 and large gear 222 in the driving portion 211 and 221 of the two optic sensing set 21 and 22 may be installed outside the upper piece 11 outwards so to connect with the sliding bar set 4, wherein long holes 411 and 412 are located between said X axis and Y axis 41 and 42. The two long holes have different width for engaging with gears 212 and 222 with different sizes, while racks 412 and 422 are installed on one side within said long holes 411 and 421, and the racks 412 and 422 are engaged directly with and driven by gears 212 and 222. In consequence, the distance measuring portions of the X axis and the Y axis of the whole device may be overlapped within the case 1 with a minimum area and volume.

Since the gears 212 and 222 as well as the circular optic grid pieces 21 and 22 have different circumferences, when they are driven, the optic grid pieces 21 and 22 may have amplified effects with respective ratios, thus no matter how small the gears 212 and 222 are compressed, sufficient positions for installing bright and dark lattices are sustained on the periphery of said optic grid 21 and 22, while according the current clock techniques, the gears 212 and 222 as well as the sensor set 41 and 42 may be compressed as possible within the range for easily locating said bright and dark lattices, thus the distance measuring portions of the X axis and Y axis of the whole device may be occupied a minimum volume within said case 1. Therefore, the hardware structure of the product is compressed apparently for matching the compact requirement in the advance technology.

Shown in FIGS. 2 and 4 are the controlling device of the present invention, the optic grid set 2 with said case 1 is located as a overlapped device, thus it has only one center (i.e., the position locating the long shaft 213), in order that the overlapped height may reduce to a minimum value, the widths of the optic grid piece 21, 22 and the gears 212 and 222 installed thereon may be designed to be very thinner, this is a simple technique in the current clock manufacturing. Alternatively, how to read the bright and dark lattices on said closed optic grid pieces is a difficult problem, therefore, in the present invention, said bright and dark lattice on the optic grid piece 21, 22 are designed in different circumferences and interleaved with each other, and wherein the inside of a large optic grid piece 22 is transparent. Accordingly, when the receiving portion 312 and illuminating portion 311 of the optic crystal set 31 on the sensor set 3 are installed on the upper and lower sides of said case 1, respectively, only reading the bright and dark lattice on the optic grid piece 31, while the receiving portion 322 and illuminating portion 321 of the sensor set 32 are associated to the bright and dark lattice portion of said optic grid piece 22. During reading, the illuminating portion 321 emits the optic grid piece and the light is penetrated therethrough so to illuminate the optic grid pieces 22, and then the receiving portion receives the penetrating light, therefore, the moving message may be read in the close condition. Besides, the sensor sets 31 and 32 may be selected to be arranged in a position orthogonal to the case 1 so to properly save the space, thus the product volume may be further reduced.

Accordingly, as the embodiment of the present invention shown in FIG. 4, a frame 6 is installed and the two sides thereof are installed with sliding slots 61 parallel to X axis, respectively, while another two sides thereof are installed with two sliding slots 62 parallel to Y axis, respectively, so that the sliding bar 4 can be slid within said sliding grooves 61 and 62 so to move steadily. In operating, when the frame 6 is moved, the gears 212 and 222 may be moved on the racks 412 and 422 of the sliding bar set 4, in consequence, the optic grid pieces 21 and 22 are rotated and read by the sensor sets 31 and 32 so that the control circuit may measure the moving distance and direction, then the read message is transferred to the computer in order that the cursor on the display may induce a corresponding movement. Since the structure of this embodiment is further compact, the assembled volume of the cursor controlling device may be further reduced, thus the cursor on the computer display is controlled within a smallest area, and since in using the user's hand held the frame portion 6, or the whole frame is located within the disk for moving the case 1, while the whole case 1 is assembled by gears 212 and 222 as well as sliding bar set 3, therefore, the sliding bar set 3 may match the optic grid pieces set 2 with each other so to rotate to any angle and to suit the user's hand, however, in the prior art the fault displacement inducing from the incorrect hand pose is prevented. Since the whole device is protected by compact enclosing, the dust and water will be avoided to flow into said case.

As shown in FIG. 5A, the device of the present invention is operated with the firmware thereof, said finger controllable element may be installed on the keyboards, remote controllers, the operating board of portable computers, mice or other products, wherein the cursor controlling device of the present invention may be moved within an area with a length of 0.5 inch. In such a very small range, the finger controllable element is well programmed. Basically, the present invention uses a absolute coordinate (pixel—pixel) to map the whole screen, and still has other space for automatically scrolling and for the cursor to move to the boundary (will be described in the following). Thus, the present invention may be installed on a wireless remote controller with a minimum volume. A further practical embodiment is shown in FIG. 5B, one face of this remote controller is installed with the minimum finger controllable element of the present invention for operating hand, and the lower side of remote controller is installed with a input key for operating by the user, such a design is match the requirement of ergonomics, so that the controller may suit the further development about the combination of the multimedia computers and TV.

Figure 7:
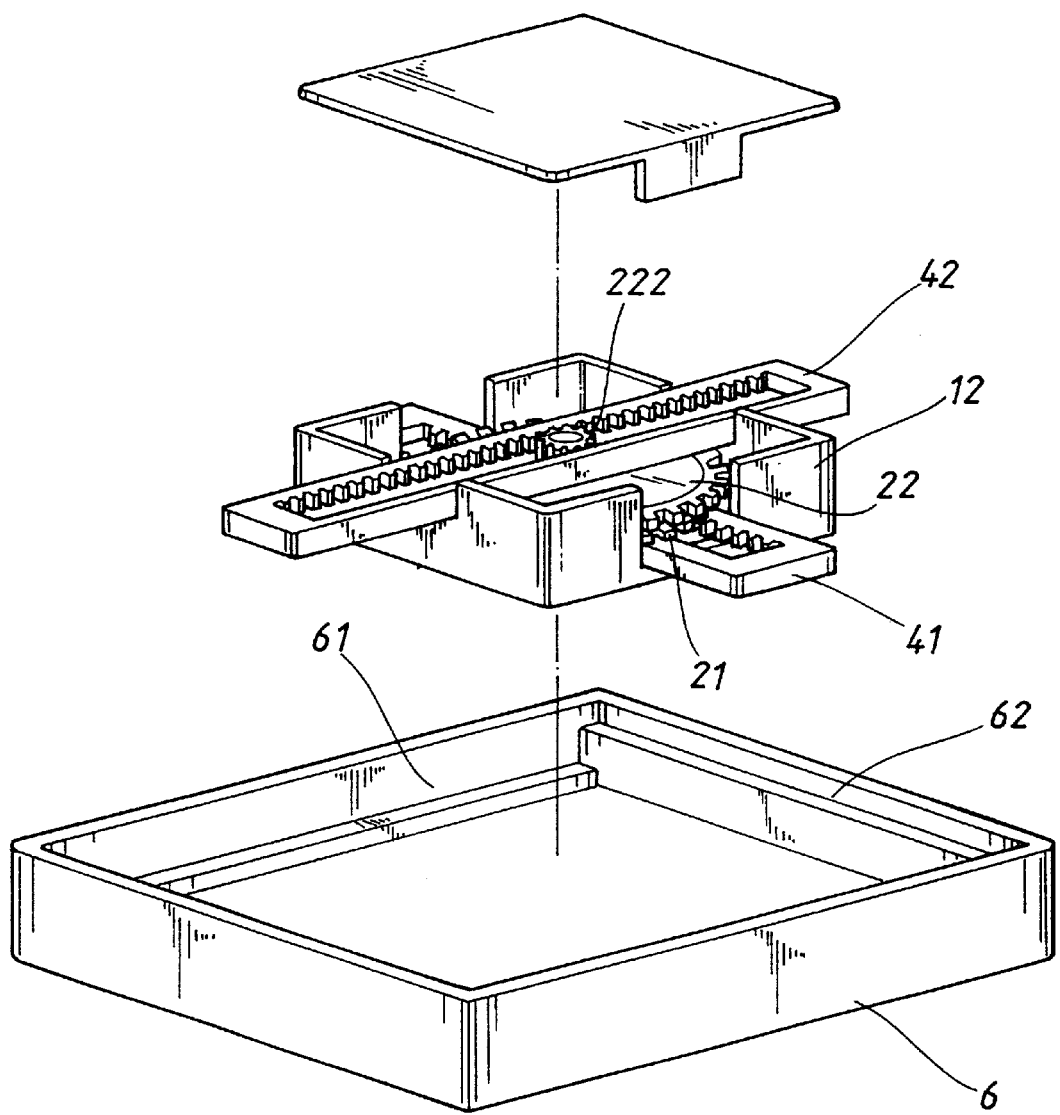
FIG. 7 is an assembly view of the cursor controlling device of the second embodiment in the present invention.
Figure 8:
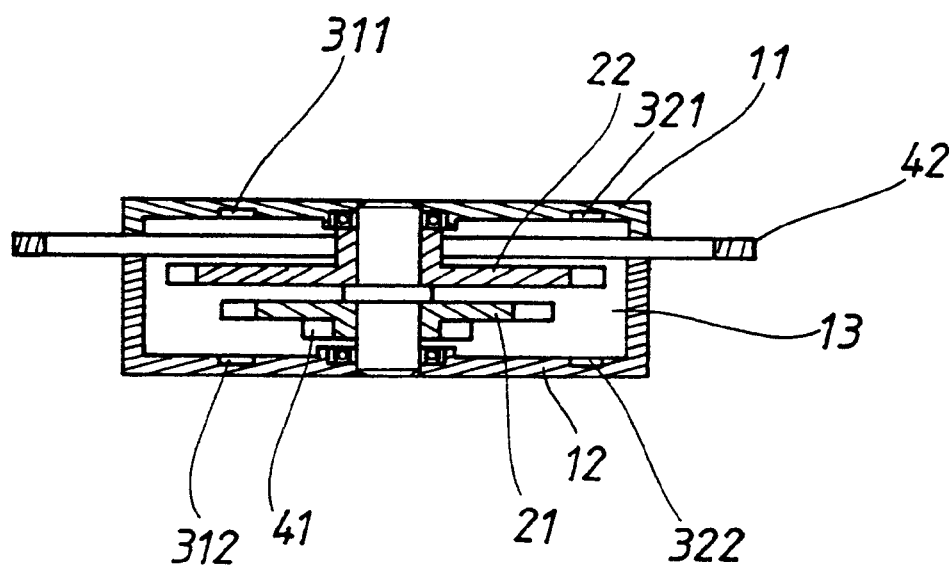
FIG. 8 is an assembly plan view of the cursor controlling device of the second embodiment in the present invention.

Now referring to the second embodiment of the present invention as shown in FIGS. 6, 7 and 8, wherein said cursor controlling device is mainly comprised of:

A case 1 which is comprised of an upper device 11 and a lower piece 12, wherein concave cavities are installed on the opposite surface of said upper and lower pieces 11 and 12 so to form a container 13;

an optic grid set 2 within said case 1 having at least two optic grid pieces 21 and 22 so to associate with the movements of X axis and Y axis;

an optic sensing set 3 within said case 1 and having at least two sensor sets 31 and 32 each of which has at least an illuminated portion 311 or 321, respectively and receiving portion 312 or 322, respectively, said two portions are buried on the upper and lower sides of said upper and lower pieces 11 and 12 with respectively to said optic grid pieces 21 and 22 for reading the bright and dark messages;

a sliding bar set 4 having at least X axis and Y axis sensor set 41 and 42 for driving said optic grid pieces 21 and 22, respectively.

wherein the main port of this embodiment is that said installed optic sensing set are serially connected on the proper portion on the container 13 of said case 1 actively. The optic sensing set 21 and 22 has a circular shape, and the driving portions 211 and 221 are gears which are connected with the center of said circular shape, i.e., the optic grid pieces 21 and 22 are installed with gears 212 and 222, respectively, and the two optic grid pieces 21 and 22 also installed with central holes 215 and 224 so that a central axis 7 may serially penetrate therethrough. A expanding portion 71 is installed on the middle portion of said central axis 7 for dividing the two optic grid pieces 21 and 22, thus the two optic grid pieces will avoid to collide with each other. In assembly, the gears 212 and 222 of the driving portions 211 and 221 of the two optic sensing set 21 and 22 are covered by the long holes 411 and 421 of the sensor set 41 and 42 of the X axis and Y axis, respectively, and then are directly engaged with the rack 412 and 422, next the two ends of the middle shaft 7 are covered by bearings 51 and 52 so to fix on the upper and lower pieces 11 and 12 of the case 1. Concave mouths are installed on the rim portion of said upper and lower pieces 11 and 12, thus after assembling, the case 1 may move with respect to said sliding bar set 4, and a notch 14 is installed on the outer surface for containing the sliding bar set 4. Besides, the distribution of bright and dark lattices of the optic grid pieces set 3 and the reading of the optic sensing set 3 are the same as those described hereinabove, so it will not be described again.

Figure 9:
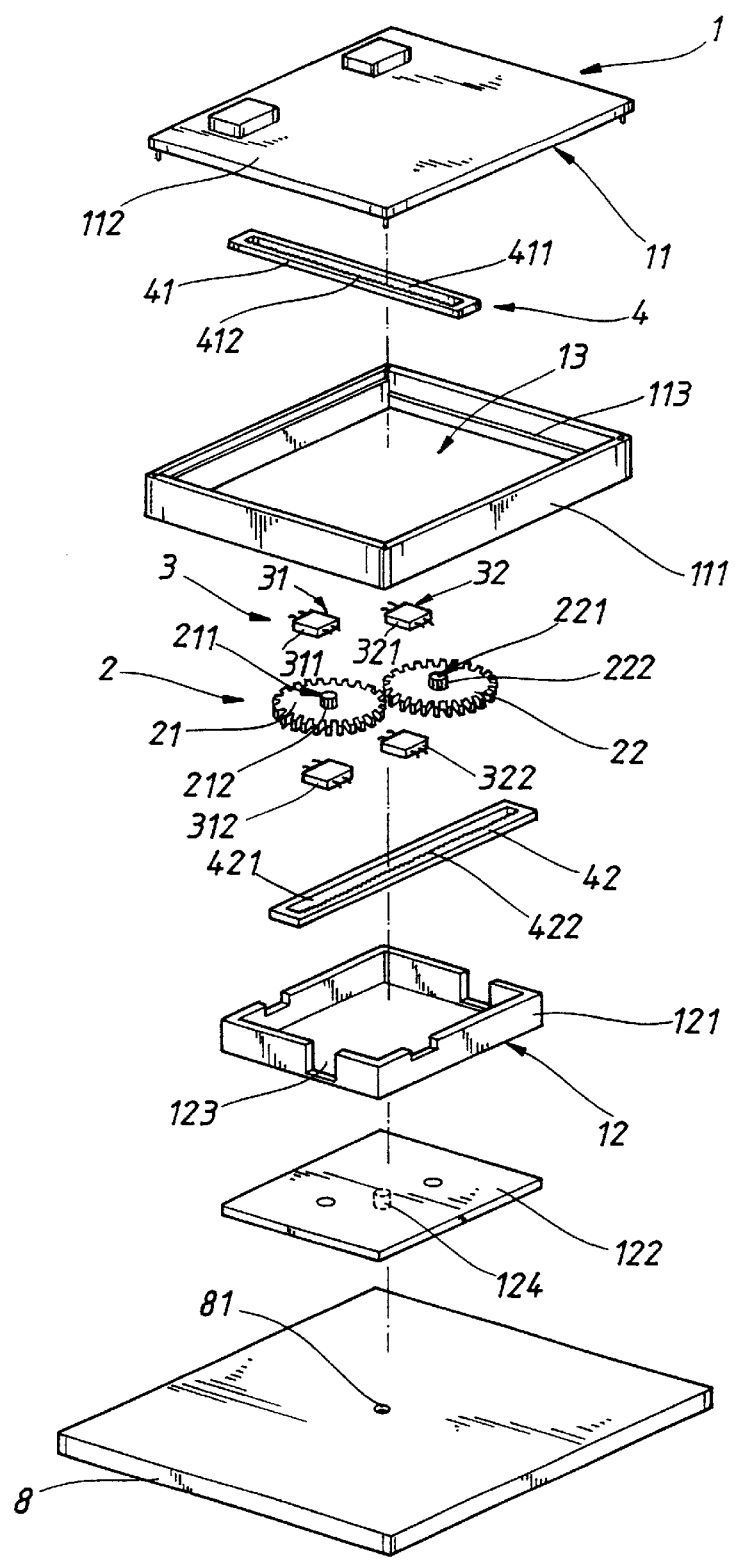
FIG. 9 is an exploded schematic view of the cursor controlling device of the third embodiment in the present invention.

Now referring to the third embodiment of the present invention as shown in FIGS. 9 and 10, wherein said cursor controlling device is mainly comprised of:

A case 1 which is comprised of an upper piece 11 and a lower piece 12, the upper piece 11 is constructed from a frame 111 and a plate body 112, while the lower piece 12 is constructed from a frame 121 and a plate body 122, so that a concave cavity is installed between the upper and lower pieces 11 and 12, wherein the plate body 112 of the upper piece 11 may be installed with an input key, while the two inner sides of the upper piece 11 are installed with a walking track 113. A concave mouth 123 is installed on the frame 121 of the lower piece 12 for sliding the sliding bar set 4.

An optic grid set 2 within said case 1 having at least two optic grid pieces 21 and 22 on which a plurality of bright and dark lattices are installed so to associate with the movement of X axis and Y axis;

An optic sensing set 3 within said case 1 and having at least two sensor sets 31 and 32 each of which has at least an illuminated portion 311 or 321, respectively and receiving portion 312 or 322, respectively, the two receiving portions are respective to said optic grid pieces 21 and 22 for reading the bright and dark messages;

A sliding bar set 4 having at least X axis and Y axis sensor set 41 and 42 for driving said optic grid pieces 21 and 22, respectively.

wherein the main point of this embodiment is that said installed optic sensing set are connected in parallel on the proper portion on the container 13 of said case 1 actively. Therefore, on the proper positions of the plate body 112 and 122 are installed with holes for positioning the two optic grid pieces 21 and 22 in parallel. Further, the optic sensing set 21 and 22 has a circular shape, and the driving portions 211 and 221 are gears which are connected with the center of said circular shape, i.e., the driving portion of the optic grid pieces 21 and 22 are gears 212 and 221, respectively, which are connected with the center of said disk and are combined with a set 4, wherein long holes 411 and 421 are installed on the medium of the X axis and Y axis sliding bar sets 4, respectively, while racks 412 and 422 are installed on the inner side of the long holes 411 and 421 for directly engaging with the gears 212 and 222 for driving said racks to run exactly, and the two inner sides of the upper frame 111 are installed with walking track 113 for sliding bar 41 to slide, while concave mouth 123 is installed on the lower frame 121 for passing through by sliding bar 42. In this assembly, since the optic sensing set 3 and the set 4 are located on the same plane, thus the width thereof may be reduced to a minimum value for installing on said manual operating device, and similarly, it may be used to control the cursor movement on the display screen with a very small moving area.

Another, in this embodiment, the used circuit board may be installed directly as the lower piece plate body 122, and a pillar 124 may be installed on the lower portion for inserting into the hole 81 in the surface of the bottom plate 8 so that the sliding bar set 4 and optic grid pieces set 2 may be installed on said bottom plate 8 and may be rotated within any angle with the case 1, but the positioning value will be input exactly according to the operation of the human hand.

Figure 11:
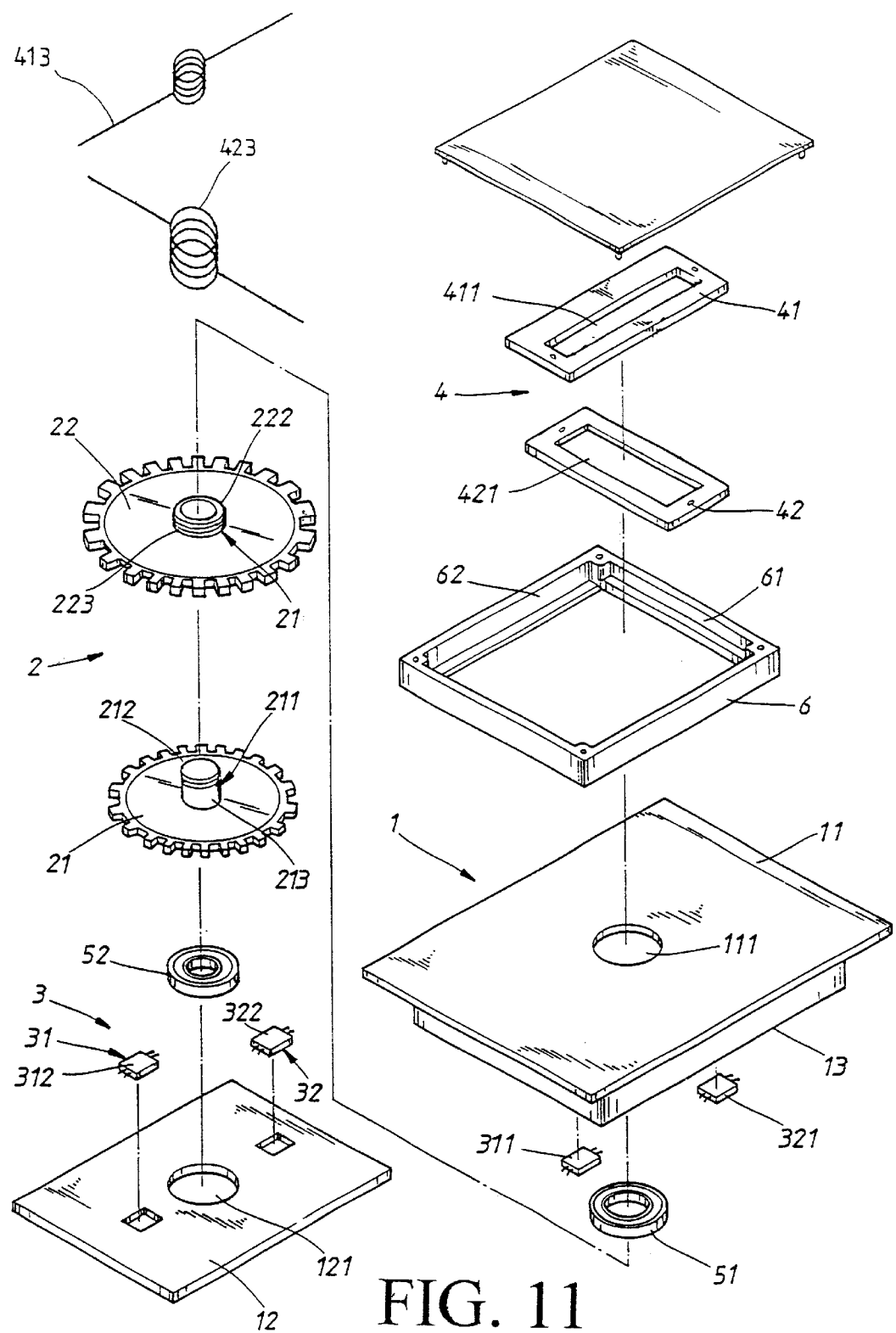
FIG. 11 is an exploded view of the cursor controlling device of the fourth embodiment in the present invention.

As shown in FIG. 11, in the practical usage of the present invention, the driving portions 211 and 221 of the optic grid pieces 21 and 22 may also be hollow axial bodies, while ropes 413 and 423 are installed on the sliding bar set 4, respectively. When the two ropes 413 and 423 are combined, the medium porition thereof is intercated around the hollow axial bodies of the optic grid pieces and the two end thereof are fixed on the sliding bars 41 and 42. Accordingly, the optic grid pieces 21 and 22 may be driven to rotated by the movement of the sliding bars 41 and 42.

Figure 12:
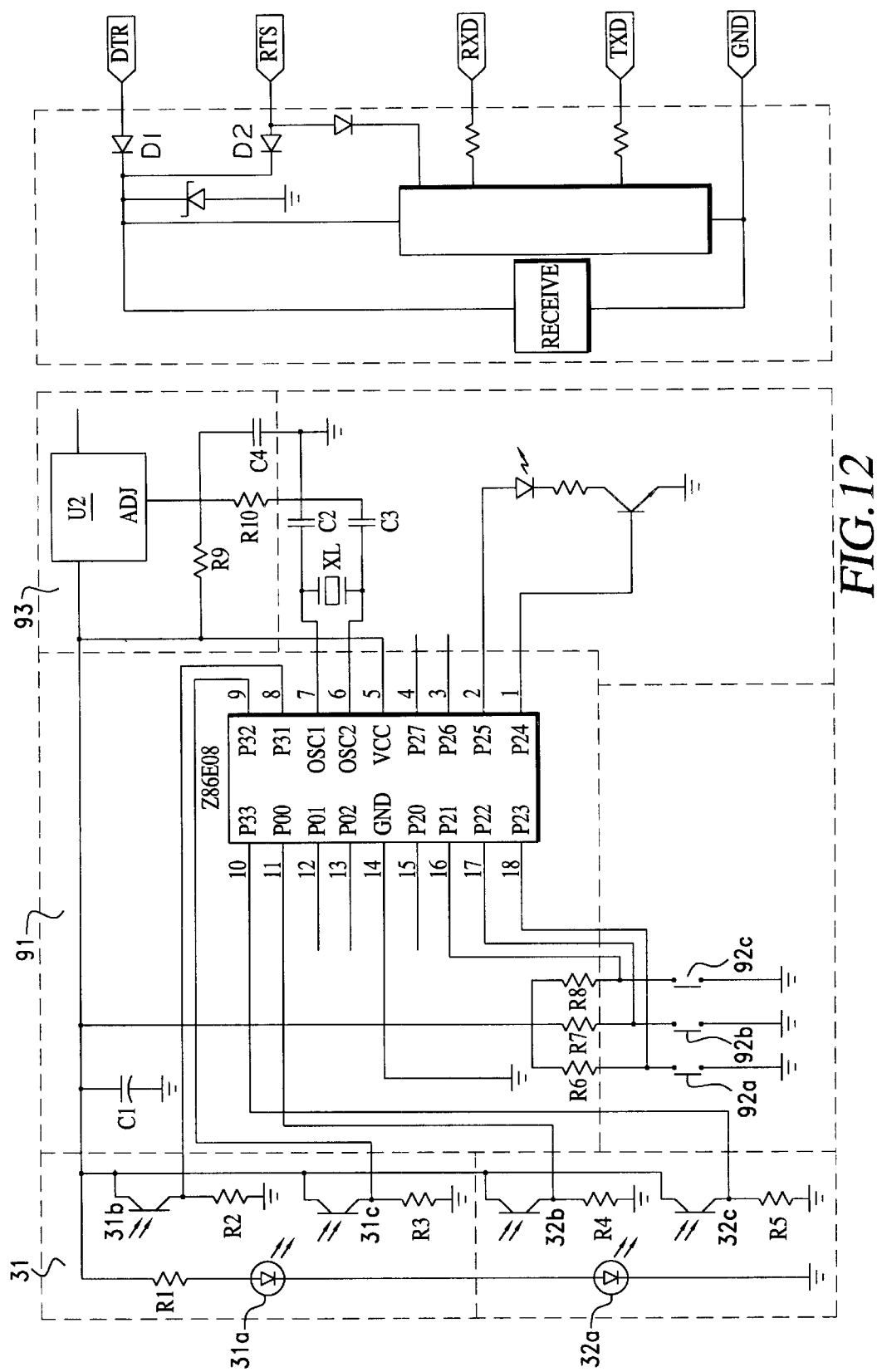
FIG. 12 shows the circuit diagram of the present invention.

Shown in FIG. 12 is an application circuit diagram of said embodiment; wherein light are emitted from the light emitted diode 31a of the X axis optic sensing set 31 on the light emitted portion 311 of a photoelectric circuit to optic grid pieces 21, the phase XA generated by the bright and dark lattice is received by the optic transistor 31b of the receiving portion 312, and the phase XB is received by the optic transistor 31c, and then the X axis moving signal is checked out, subsequently the moving signal of X axis and Y axis are transferred to control circuit 91 for calculating. The button key circuit 92 is installed with a left switch 92a, a medium switch 92b and a right switch 92c, the signals generated thereby are also transferred to control circuit 91; a steady voltage circuit 93 is used to supply steady power supply; an output circuit 94 is used to transfer the signal amplified by control circuit 91 to a computer through a transmission line.

Figure 13:
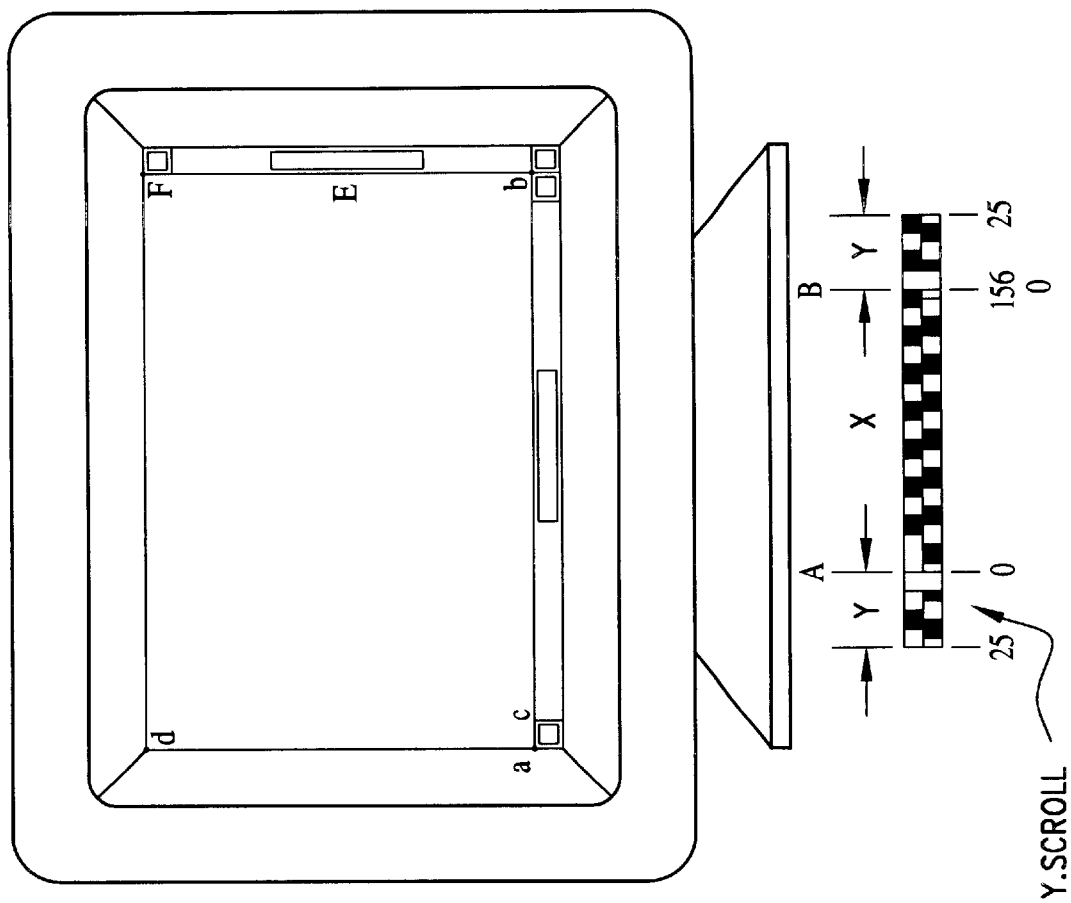
FIG. 13 is a schematic view shown that a finger controllable element of the present invention with respective to the moving of the display cursor.
Figure 13:
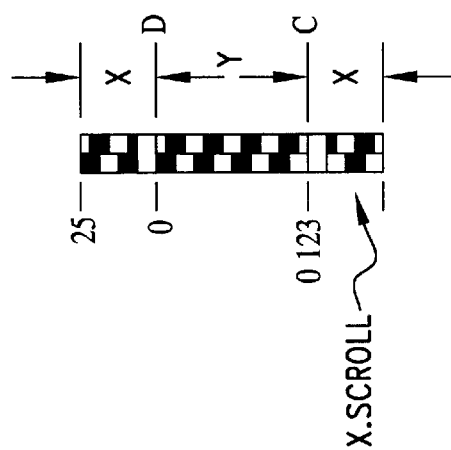

FIG. 13 shows the cursor controlling method of the firmware of the present invention, wherein the control circuit is used to control the movement and positioning of a cursor on a computer display, the method is comprised of:

A. a finger controllable element having a case 1; B. at least two optic grid pieces 21 and 22 and at least two sensor sets 31 and 32 for generating bright and dark signals for reading the messages on the finger controllable element; C. at least two recorder for presetting the length value which is used for the optic grid pieces 21 and 22 to produce the bright and dark signals; and it is controlled by the following two operating modes:

a first operating mode is used to detect the movement of said finger controllable element so that the moving distance of the cursor on the display is represented by at least two ratios v1, v2, v3, ... vn which is positive proportional to the moving distance of the cursor moving on the display, i.e., the movement from the left point A to the right point B, or from the upper point C to the lower point D of the cursor may be corresponding to distance of the point a to point b, or point c to point d on cursor's screen. Besides, the second operating mode is means that a default enlarged virtual pointer section will cause the finger controllable element to move into an enlarged area, i.e. to convert into at least a specified instruction, for example, as shown in the figure, if the finger controllable element may be moved to a desired point on said display since the operation is a absolute coordinate, and then is over the boundary to the second operating mode so that the operation of two specified instructions may be performed, while one operation will be converted into the movement of the display scrolling the control rod E, and in another operation, the operation mode is converted so the cursor will fast move to the boundary F of said display.

The boundary of said first and second operating modes may be converted directly by said finger controllable element, wherein a switch is directly installed on a hardware; or as shown in FIG. 12, wherein compressed boundaries installed on the bright and dark lattices of the optic grid pieces 21 and 22, respectively, are used to separate the two operating modes. If said finger controllable element is within said boundary, the operation is in the first operating mode, or if said finger controllable element is outside the boundary, then the operation is in the second operating mode. Therefore, the further functions may be programmed:

1. If the finger controllable element is moved to the boundary of either axis (X axis or Y axis) to convert into the second operation mode, then it is judged that the movement is from scroll control rod.
2. If said finger controllable element has read a axial boundary, and then another boundary is read (for example, the X axis is read firstly, and then the Y axis is read), then the operation is converted to the action of fast arriving on the display.

Figure 14:
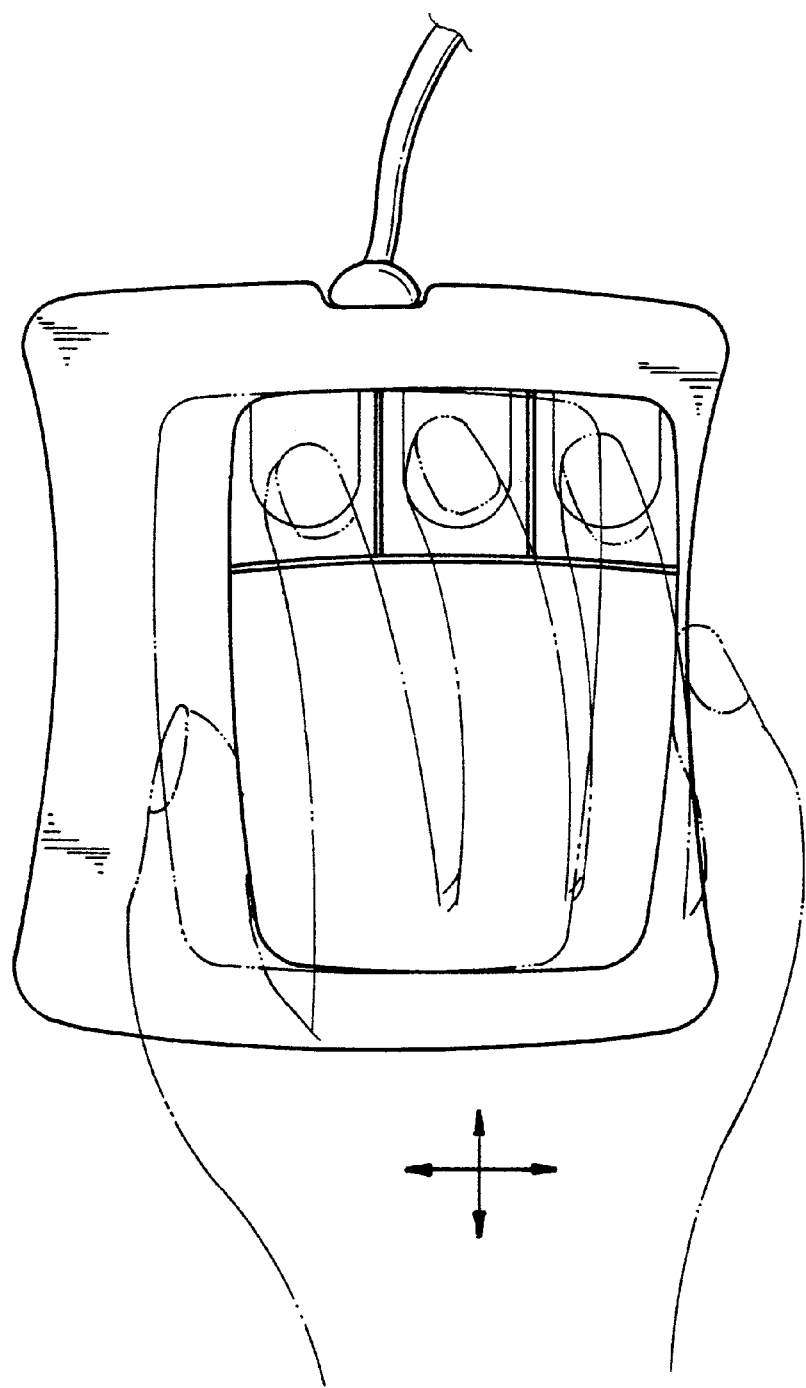
FIG. 14 is a schematic view about the screen scrolling in the second operation mode of the present invention.
Figure 15:
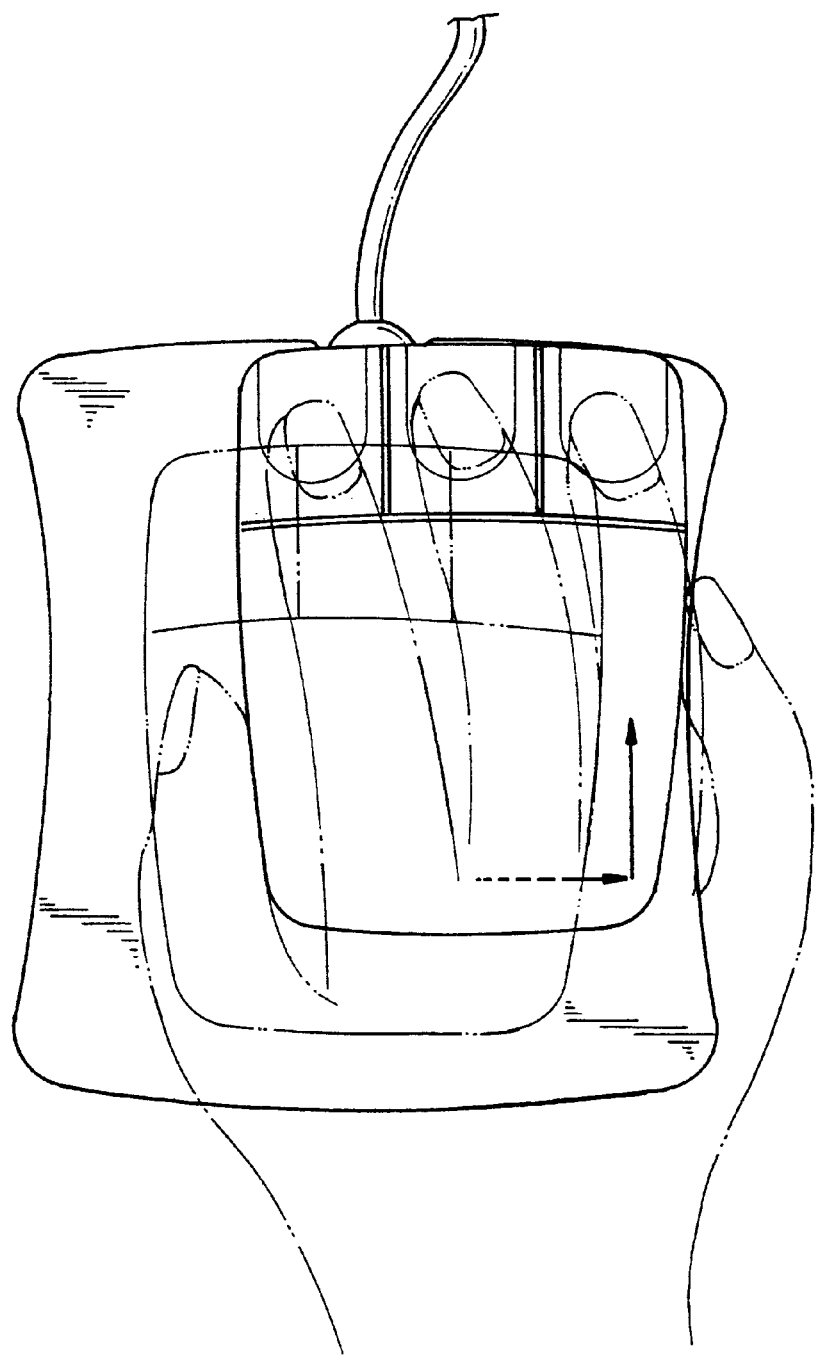
FIG. 15 is a schematic view about the operation of quickly arriving at boundary in the second operation mode of the present invention.

In other words, as shown in FIG. 14, if in the manual operation the finger controllable element moves into the said area in parallel from the upper, lower, left and right directions, then the operation is a movement of scrolling control rod, while as shown in the FIG. 15, if the finger controllable element entering said area is moved vertically to the boundary, then it converts into a operation of fast arriving at the boundary of said display, for example, the finger controllable element is entered from right side and then as reading the X axis, the operation is entering into the second operation mode, and then it is converted into the movement of scrolling the control rod, after entering, the finger controllable element is moved upwards or downwards linearly to the boundary to read the boundary messages of the Y axis, and then it is converted into an operation of fast arriving at the boundary. However, in order that the said moving operation of said scrolling control rod is the same as that of manual operation so to be controlled precisely, it is specified the operation of entering the second operation mode from the X axis boundary is specified to perform the scrolling of Y axis, while the operation entering from the Y axis boundary is specified to perform the scrolling of X axis. In judging within the structure, the center for the place locating the display scrolling control rod, and after entering into said mode, the finger controllable element is further moved vertically (for example, the finger controllable element enters the second operation mode from the right or left direction, and then moves upwards or downwards), then it is considered that the shifted center begins to scroll, and the scrolling may be accelerated according to the acceleration of the finger controllable element or the staying time of said finger controllable element, until finally if the cursor is entered into the boundary, then the operation is changed into the operation of directly arriving at the boundary fast. Such a automatic scrolling way is matched with the requirement of ergonomics, Window 95 and Internet.

Besides, in said embodiment, the bright and dark lattices on the boundary in the second operation mode may be installed on one side of the optic grid pieces 21 and 22. Such an embodiment will cause the same effects. The change of such a design is only to change the boundary original installed on the two ends to one side, thus the description will be neglect.

The cursor controlling method of the present invention will be descried in the follow with referring to the flow diagram of FIG. 16.

Figure 1:
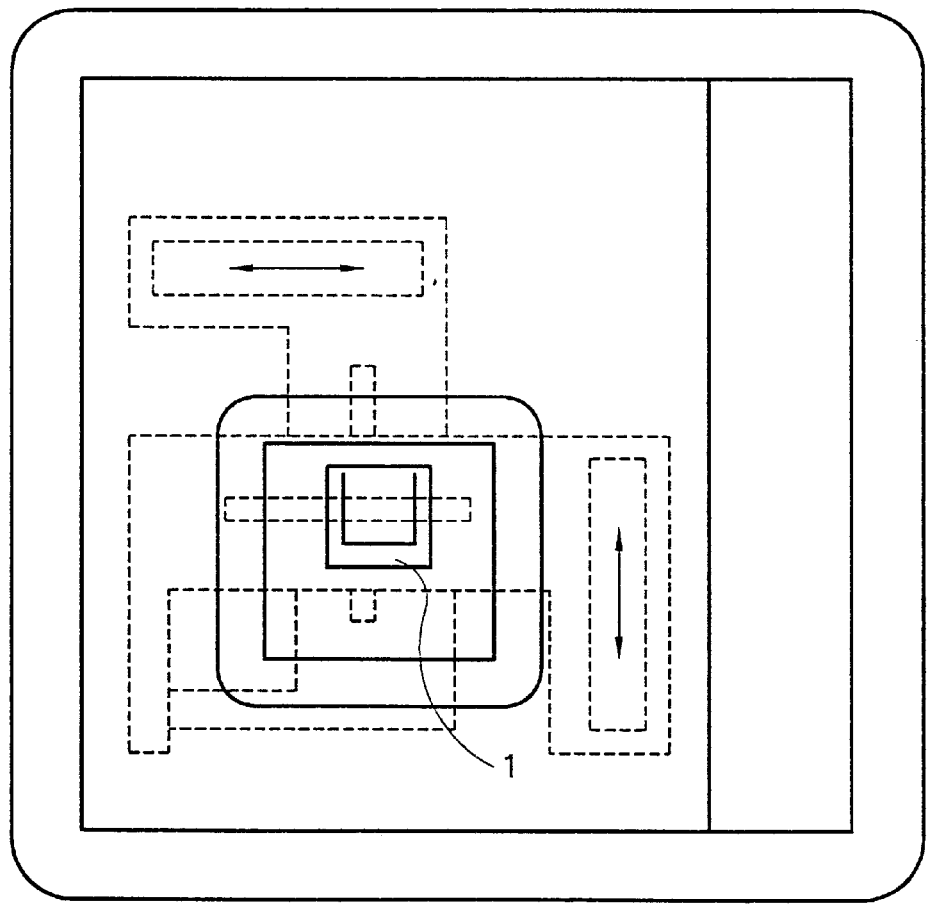
FIG. 1 is a plan view of an absolute coordinate construction of prior art.
Figure 16A:
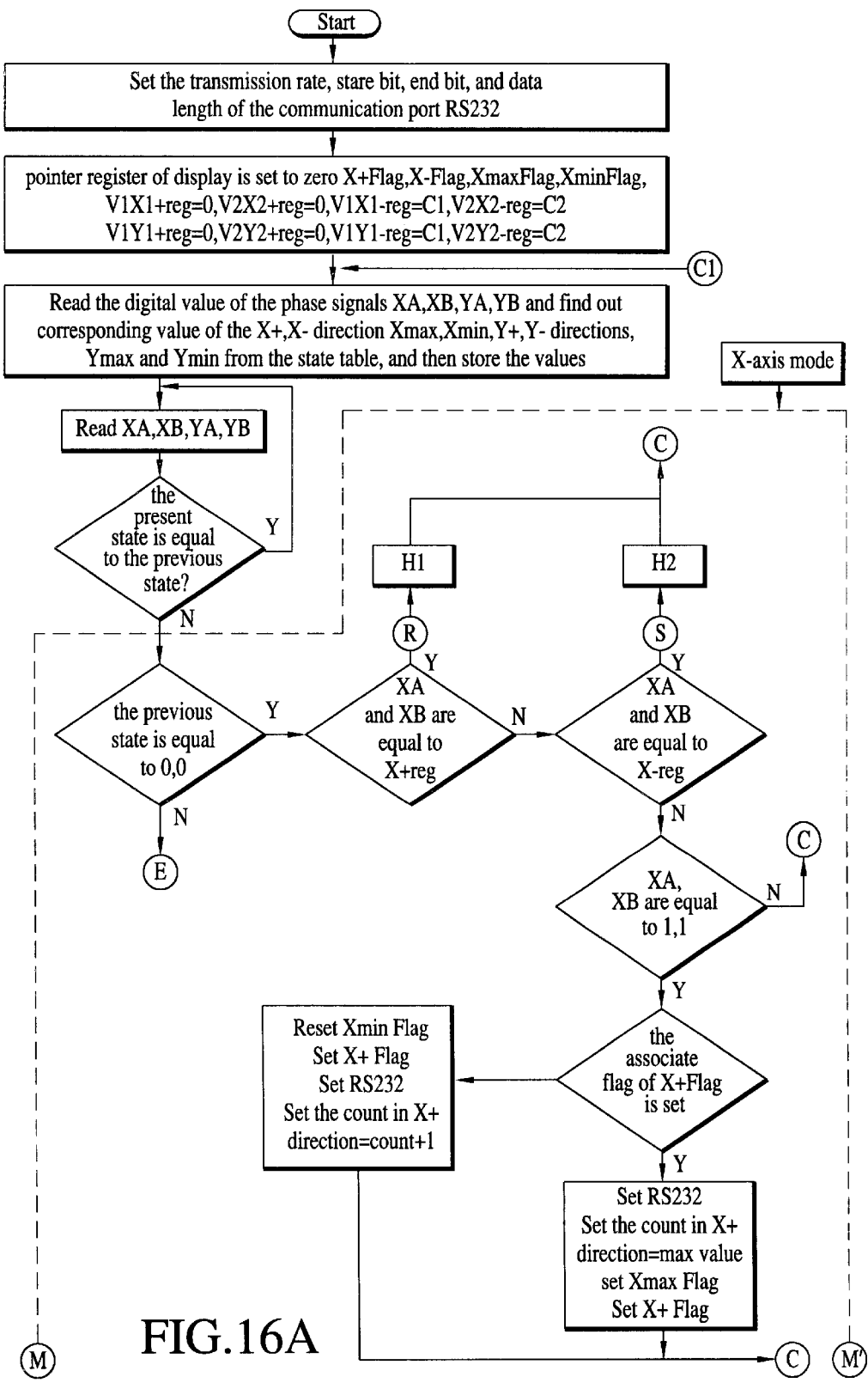

In the control flow diagram in FIGS. 16A and 16B, the transferring speed of RS232, initial bit, end bit and bit length are set at first, then all the flags and recorders are cleared, and preset value for identifying speed is set. Next, the values XA, XB, XC, and XD are read, and then the values of X+ direction, X− direction, Xmax and Xmin are searched from a comparing table (referring to the conditioning table of FIG. 1, in said table, only X axis is listed as a reference), finally these values are stored for comparing. After the values of XA, XB, YA and YB are read again, these value is compared with the previous values. If they are equal to each other, then it is determined that the finger controllable element has no displacement, then the system is restored to the status of reading the values of XA, XB, YA and YB. If these values are not equal, then the X axis mode identification (as the X axis mode shown in the dotted line of FIG. 16A) is perform at first. During identification in this mode, the previous statue is divided in one of the status (0, 0), (1, 0), (1, 1), (0, 1), the change time for each status may be read from the identification of computer, thus, the finger controllable element may be derived. Since the clock of a computer oscillator is 4–8 MHz, but in practice, the speed for finger to control the finger controllable element will not be over 5 kHz, both clocks has large difference, therefore, the speed of finger controllable element is easy to be identified.

Figure 16C:
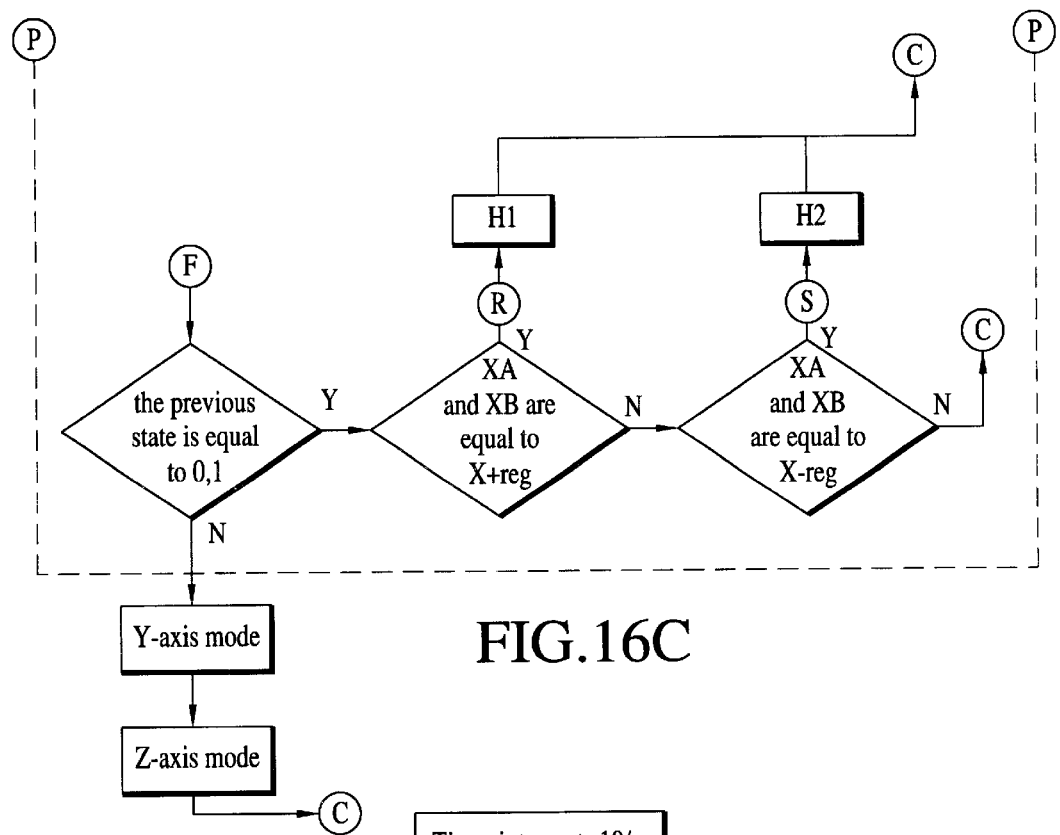
Figure 16F:
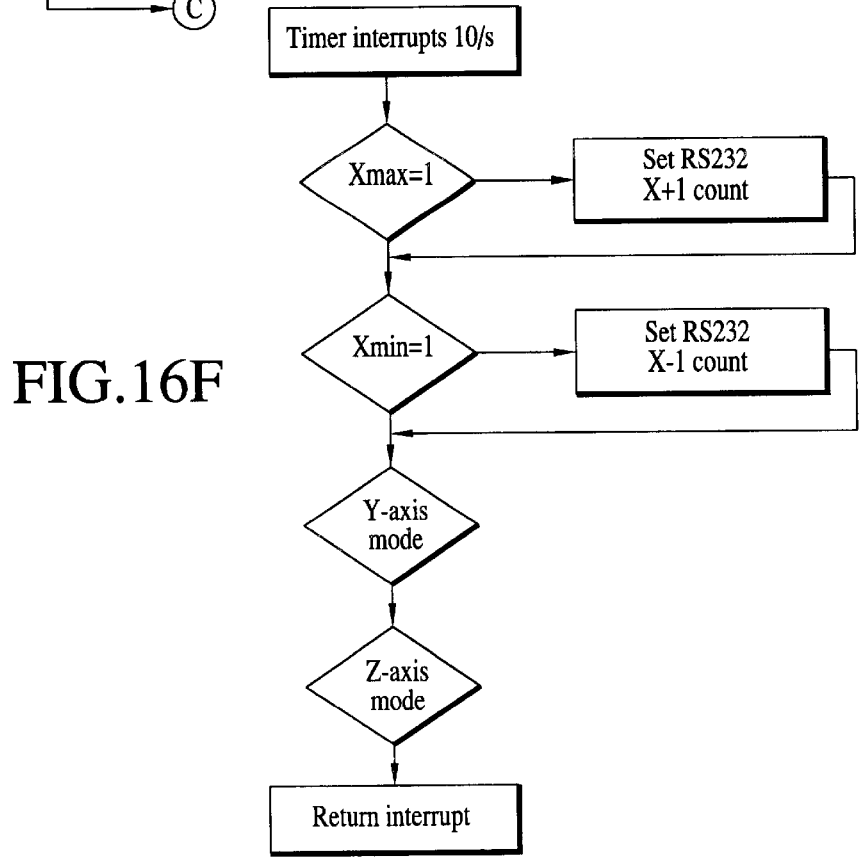
Figure 16E:
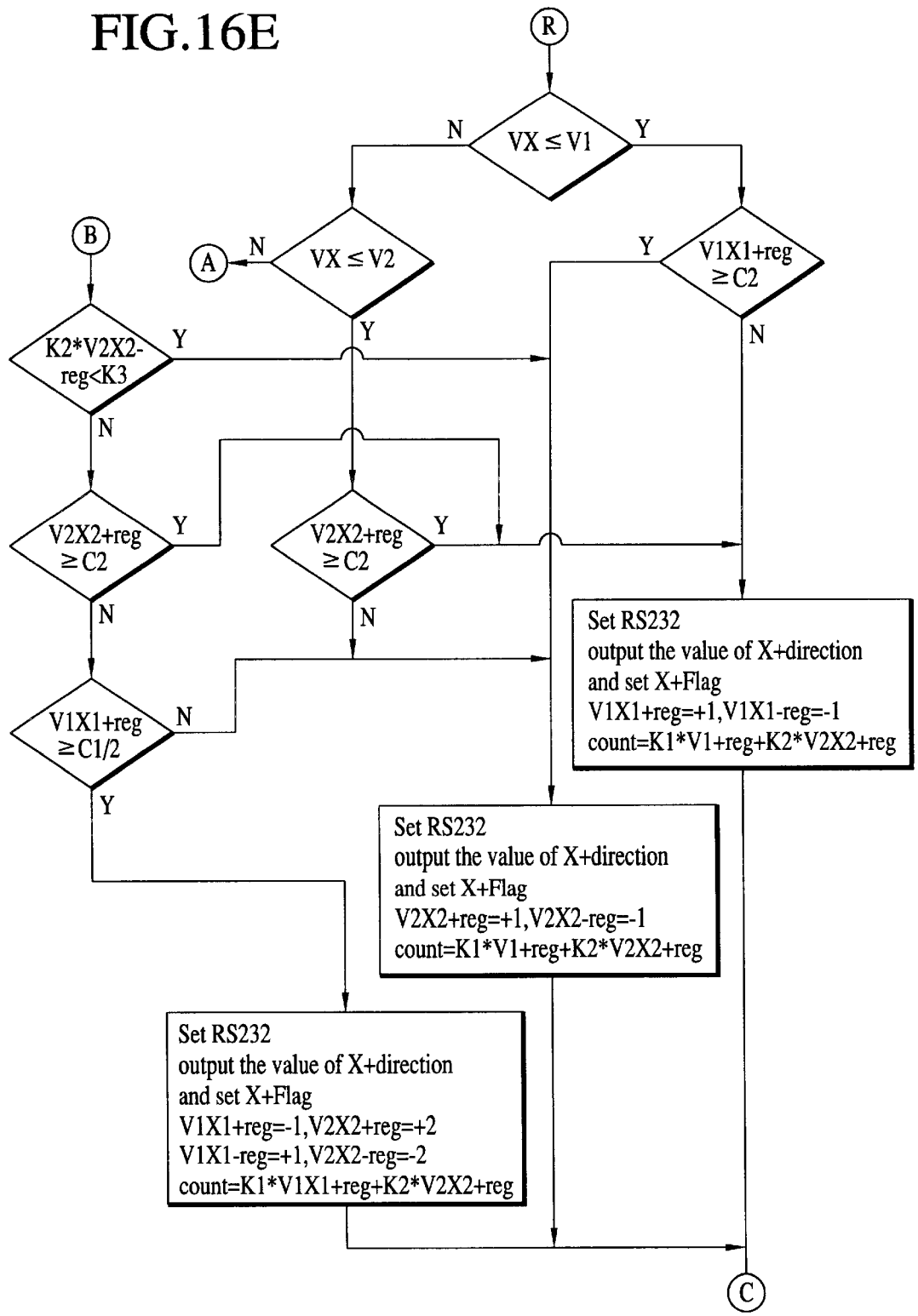
Figure 17A:
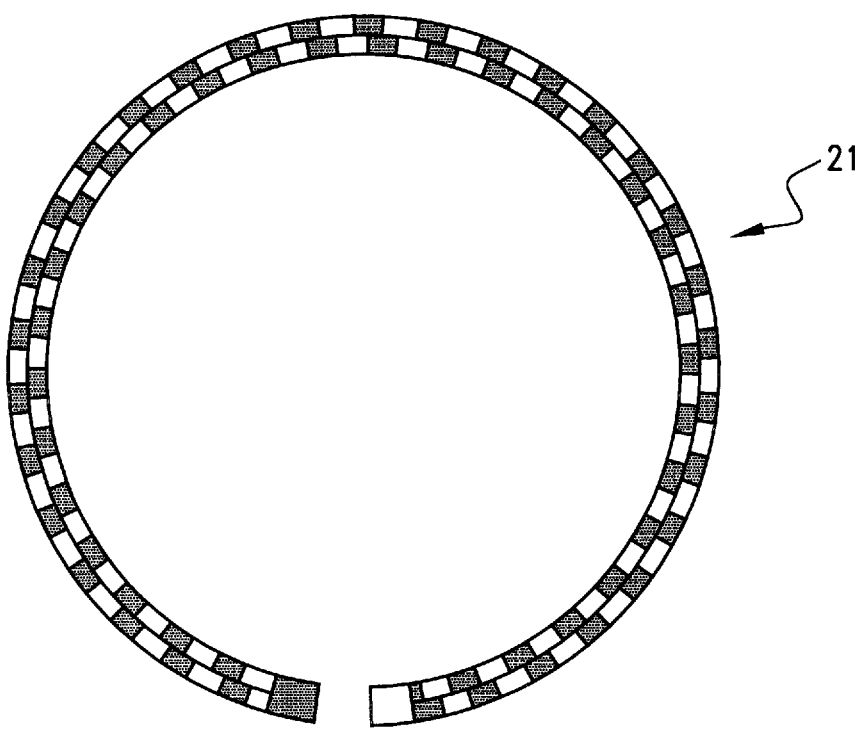
FIG. 17A is a schematic view of the enlarged view of the optic grid pieces in the embodiment of the present invention.
Figure 17B:
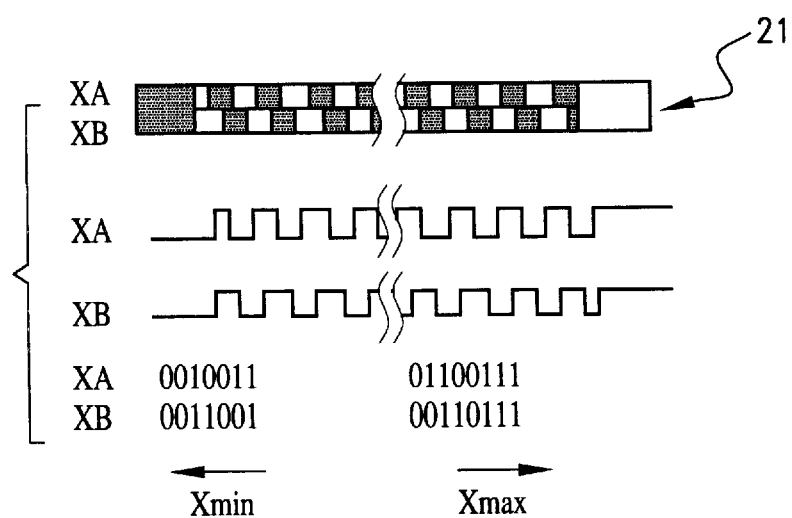
FIG. 17B shown the respective signals of the light and dark lattices in the embodiment of the present invention.

FIGS. 17A and 17B are the optic grid pieces and the respective signals of the light and dark lattices in the embodiment of the present invention. Assuming the previous status is (0, 0), referring to Table I and FIG. 16E, if XA−1, XB=o is X+ direction, if XA=0, XB=1 is X− direction, if XA=1, XB=1 has two conditions, one is minimum separation, and the other is became to the maximum value, which is determined according to the setting of X+ flag. Thereby, the signals X+ direction, Xmin, Xmax, etc. are derived, and they are recorded in a register temporarily for identifying by program. Therefore, at initial, the finger controllable element is moved to any one of the four corners, after resetting to the initial value, the absolute value of correct coordinates of X axis and Y axis may be transferred. Or if said boundary is not installed on the optic grid piece 21 (or 22), then the finger controllable element may be pushed to the upper left corner, and meanwhile, the C1 and C2 are reset to correspond to the original point at the upper left corner of the display. Therefore, as the finger controllable element is moved rightwards so to exceed the boundary (1280), it may be used to identity the second operating mode.

Figure 16D:
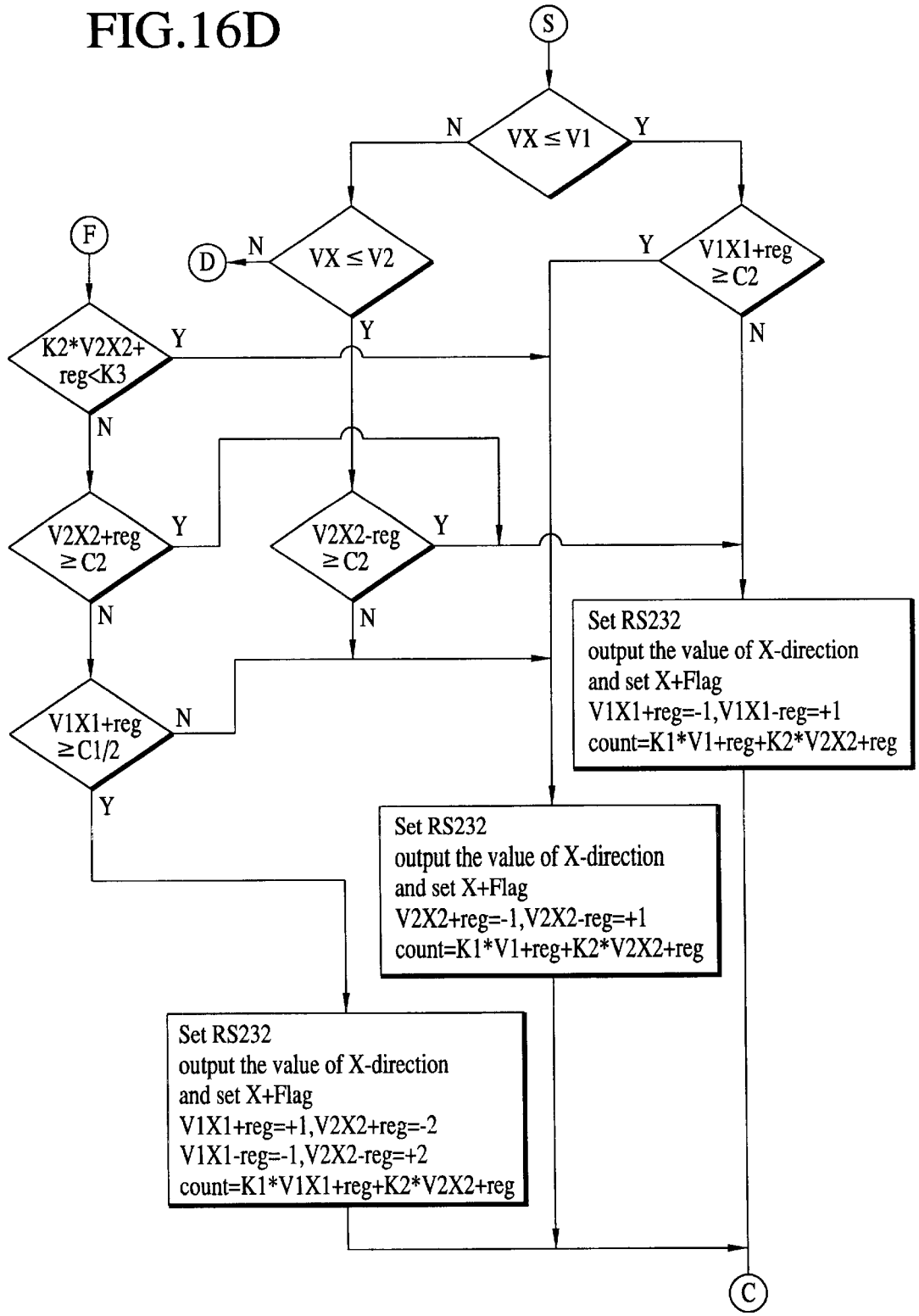

FIGS. 16D and 16E are the subprogram of positive direction and negative direction, respectively. The moving distance of the cursor moving in the display is positive proportional to the moving distance of the finger controllable element, and the positive proportional constant of the finger controllable element is determined according to the different speed level. The object of this program is listed in the following:

(1) The moving distance of the finger controllable element is reduced to be equal to or smaller than 0.5 inch, but the moving distance of the cursor moving on the display will be reduced from the reduction of the moving distance or speed of the finger controllable element, the moving speed of the cursor on the display has different proportional ratios which are proportional to the moving distance of said finger controllable element, thus it is possible that the finger controllable element has arrived at the boundary, while the cursor has not arrived at the boundary, or the finger controllable element has not arrived at the boundary, but the cursor has arrived at the boundary.

(2) The cursor of a display has moved to a area, then the cursor has fine movement around said area.

(3) The moving speed and position of the display is correspondent to the speed and position of said finger controllable element. If the finger controllable element moves fast, the speed of said cursor is increased correspondingly, thus the operation will be steady, fast and precise.

(4) Said finger controllable element (for example, in X axis) has two register in positive direction, and two register in negative direction, the positive and negative registers are correspondent with each other. Said finger controllable element cause the cursor to move to the original point correctly so that the cursor on the display also moves to the original point correctly.

The moving speed of the finger controllable element VX is changed within at least two different speed levels V1, V2, V3, . . . which are correspondent to different ratio constant K. The K value represents that the moving distance of the cursor moving on the display is positively proportional to the distance constants K1, K2 of the cursor moving on the cursor area. According to the steadiness of the cursor moving on the display, the values of K1, K2 may be (1, 2), (1, 3), (1, 4), (2, 4), etc. (the values of K1 and K2 may be preset as default values, and the user also selects said values according to the driving program). Using the formula 1: $C1+C2=C$, and formula 3: $(K1 \times C2)+(K2 \times C2)$=the distance of the display, the displacement distance C1 and C2 (which is been preset as the default values according to the resolution of display) of the finger controllable element in first and second speed level may be determined. Therefore, if the resolution of a display has been increased, it is possible only to increase the value of K2, thus the fine displacement of the cursor may match with the minimum displacement of the pixel of screen resolution. Although the value of K2 is increased with the increasing of display resolution, thus the minimum displacement of a pixel is also reduced, and the cursor may be moved steadily on the display.

EXAMPLE

Assuming that the resolution of X-axis of the display is 640; the displacement of the optic grid is equal to 196×0.08 mm=15.68 mm $-640=(1 \times C1)+(4 \times C2), K1=1, K2=4$ $196=C1+C2$ $\therefore C2=148, C1=48$ and the resolution of X-axis of the display is equal to 1024;

$-1024=(1 \times C1)+(7 \times C2), K1=1, K2=7$ $196=C1+C2$ $\therefore C2=138, C1=58;$ When the display resolution is increased from 640 to 1024, but the distance between pixels is reduced, regardless of the k2 being changed from 4 to 7, the smooth performance of the cursor moving on the display will not be affected. The cursor may be moved at precise displacement from pixel to pixel on the display, no matter the change of the display resolution on the precise displacement mode. While reduction of the distance of said optic grids will not be substituted by reducing the illumination of said optic grids and the distance of each grid, however, the number of grids is decreased (in the prior art the original 320 grids is reduced to 200 grids), thus when the finger controllable element is moved through one grid, the cursor of said display will not moved through 2 or 3 grids.

FIGS. 16D and 16E are the subprogram flow charts of the control program, explaining how the cursor is moved to a positive direction H1 and a negative direction H2, respectively, and the recorder thereof is V1X1+reg and V1X1−reg, V2X2+reg and V2X2−reg. When the finger controllable element is moved in positive direction, the valued stored in positive directional registers V1X1+reg and V2X2+reg will be increased, and another, the value stored in negative directional registers V1X1−reg and V2X2−reg will be decreased according to the increment of the positive directional registers. (When X-axis coordinate is a minimum value, the value V1X1+reg is 0, V1X1−reg is equal to C1, V2X2+reg is 0, and V2X2−reg is equal to C2; when X-axis coordinate is a maximum value, the value V1X1+reg is equal C1, V1X1−reg is 0, V2X2+reg is equal to C2, and V2X2−reg is 0.) The moved displacement of the finger controllable element at the third speed level is converted to values V1X1 and V2X2 by using formulas 4 and 5 listed in Table III. Then, these values are stored in registers V1X1+reg and V2X2+reg respectively, and then the value of K3 may be calculated by using formula 2 listed in Table III. After these procedures, the finger controllable element may correctly return to original point, and the cursor on the display may also correctly return to original point.

For example:

$K1=1, K2=4$ $K3=(n-1)K2-(n-2)K1$ $=(3-1)4-(3-2)1$ $=7$

Therefore, as the displacement of the finger controllable element is equal to 1, the movement of the cursor on display will be equal to 7. Further, the displacement of the finger controllable element at the third speed level may be converted and recorded in the registers V1X1+reg and V2X2+reg by using formulas 4 and 5 listed in TABLE III.

When the displacement of said finger controllable element is equal to 1, the displacement of said display is equal to 7

$K2XVV2X2++K1XV1X1$=display value;

$V2X2++V1X1$=the moving distance of the finger controllable element $7\times1=4\times V2X2++V1X1$ $1=V2X2++V1X1+V2X2+=+2, V1X1+=-1$ It is noted, in this case, the increment of V2X2+reg is 2, and the decrement of V1X1+reg is 1.

Therefore, it shows that for the value at positive direction, V2X2+reg+V1X1+reg=2+(−1)=1, this is matched with the real displacement of the finger controllable element at the third speed level. Moreover, formula 3: $(K1\times C1)+(K2\times C2)$=the display distance $K1XV1X1+reg+K2XV2X2+reg$=the displacement of the display i.e., $(1\times-1)+(4\times2)=7$ It shows the same result that the displacement of the cursor on display is equal to 7 when the finger controllable element is moved at the third speed level. The displacement of the finger controllable element at the third speed level is converted into values V2X2+ and V1X1+ by formulas 4 and 5 listed in TABLE III, and then said values are recorded in registers V2X2+reg and V1X1+reg, respectively.

It is obviously that the moving speed and positioning of the cursor on the display is matched with that of the finger controllable element of the present invention with the advantages of stable, fast, and precisely moving effects. The finger controllable element has two positive directional registers and two negative directional registers. The values stored in the positive directional registers is respective to that in the negative directional registers so that the finger controllable element may correctly return to original point and also the cursor may correctly return to original point correspondingly.

In the present invention, it is necessary that the positive directional registers is respective to the negative directional registers. The positive directional registers and the negative directional registers are only for the purpose of well understanding. Therefore, it is only needed to install one register on either direction of the X axis.

After the main program has determined the procedure in direction X+ as described hereinabove, in step F41 of FIG. 16D and 16H, the procedure determines whether VX is less than or equal to a predetermined speed. If yes, it indicates the speed of the finger controllable element is less than the lower limit of speed V1, i.e. the first speed level. Then in step F42, it further determines whether the value stored in V1X1+reg of the first speed level is greater than or equal to C1. In the step 43, If no, then the value of V1X1+reg is increased with 1 and the value of V1X1−reg is decreased with 1, and transmitting the value. If the value recorded in register V1X1+reg of the first speed level is larger than or equal to C1, it indicates the V1X1+reg reaches a maximum value. In such a case, the displacement of the cursor will be set to be proportional to that of the finger controllable element multiplied with a value K2, and then in step F46 increasing the value of V2X2+reg with 1, and decreasing the value of V2X2−reg with 1, and transmitting the value.

If the result in step F41 is no, it indicates that the finger controllable element is equal to the upper limit of the speed V1. Then in step F44, it further judges whether VX is equal to the upper limit or lower limit of the speed V2. If VX is equal to the lower limit of V2, then in a step F45, it is performed to judge whether the value recorded in the register V2X2+reg is maximum value or not. If yes, the displacement of the cursor will be set to be proportional to that of the finger controllable element multiplied with a value K1. In the step F46, if no, the displacement of the cursor will be set to be proportional to the displacement of the finger controllable element multiplied with a value K2.

If only three speed levels are set in finger controllable element, the A and B in FIG. 16D are connected together, thus, if the result in step F44 is no, then the step F47 is performed to read the left count remained in the positive register V2X2+reg. If the value of K2×V2X2−reg is less than K3, the displacement of the cursor will be set to be proportional to that of the finger controllable element multiplied with K2, and then the step F46 is performed to avoid that the cursor value exceeds over the display boundary or can not restore to the original point as in the performing speed of the cursor positioning device exceeds that of the speed V2. If the result in step F47 is no, the step F48 is performed to judge whether the register V2X2+reg is greater than or equal to a maximum value. If yes, the displacement of the cursor will be proportional to that of the finger controllable element multiplied with a constant K1; if no, it indicates that the register V2X2+reg remains value for the displacement of the finger controllable element in positive direction at the third speed level may be transferred and recorded in the register V1X1+reg and V2X2+reg. Next, in step F49, the procedure judges whether the fine displacement in positive direction exceeds a half of the distance. If no, step F46 is performed in which the displacement of the cursor is still proportional to the displacement of the finger controllable element multiplied with a constant K2; if yes, step F50 is performed, wherein the value of V1X1+reg is subtracted with 1, the value of V2X2+reg is added by 2, the value of V1X1−reg in negative registers is added by 1, and then the value of V2X2−reg by 2 is subtracted with 2. Therefore, when the finger controllable element is operated at the third speed level, the register V1X1+reg remains a value that is half of C1. In consequence, as the cursor is moved to any objection on the display, there are fine displacements always around where the cursor presents.

Furthermore, the speed VX of the finger controllable element of FIG. 16D is divided into three speed levels, i.e. $0<VX \leq V1$, $V1<VX \leq V2$, and $VX>V2$. Besides, the speed VX may be divided into two speed levels, still having good performance as described hereinabove and also applicable to the most procedures of FIG. 16D. In this alternative embodiment, if the answer in step F41 is no, the step F47 is performed, neglecting steps F44 and F45, but the step is remained. It means that the speed level V1 is set to be nearly similar to or the same value as V2. So, the second speed level may be neglected as the finger controllable element judges the value of VX. Therefore, the firmware may be modified, or the key switch may be further programmed, thus, the user just simply clicks the switch to enable the cursor positioning device operating at the first speed level. If switch again is clicked by the user again, the cursor positioning device can operates at the third speed level in which cursor on the display is permitted to be moved fast. Moreover, the movement of the cursor on the display is also in accordance with the speed increment of said finger controllable element moving on said speed level.

FIG. 16E is a subprogram flow chart of the control program which is similar to that of FIG. 16D.

Figure 16G:
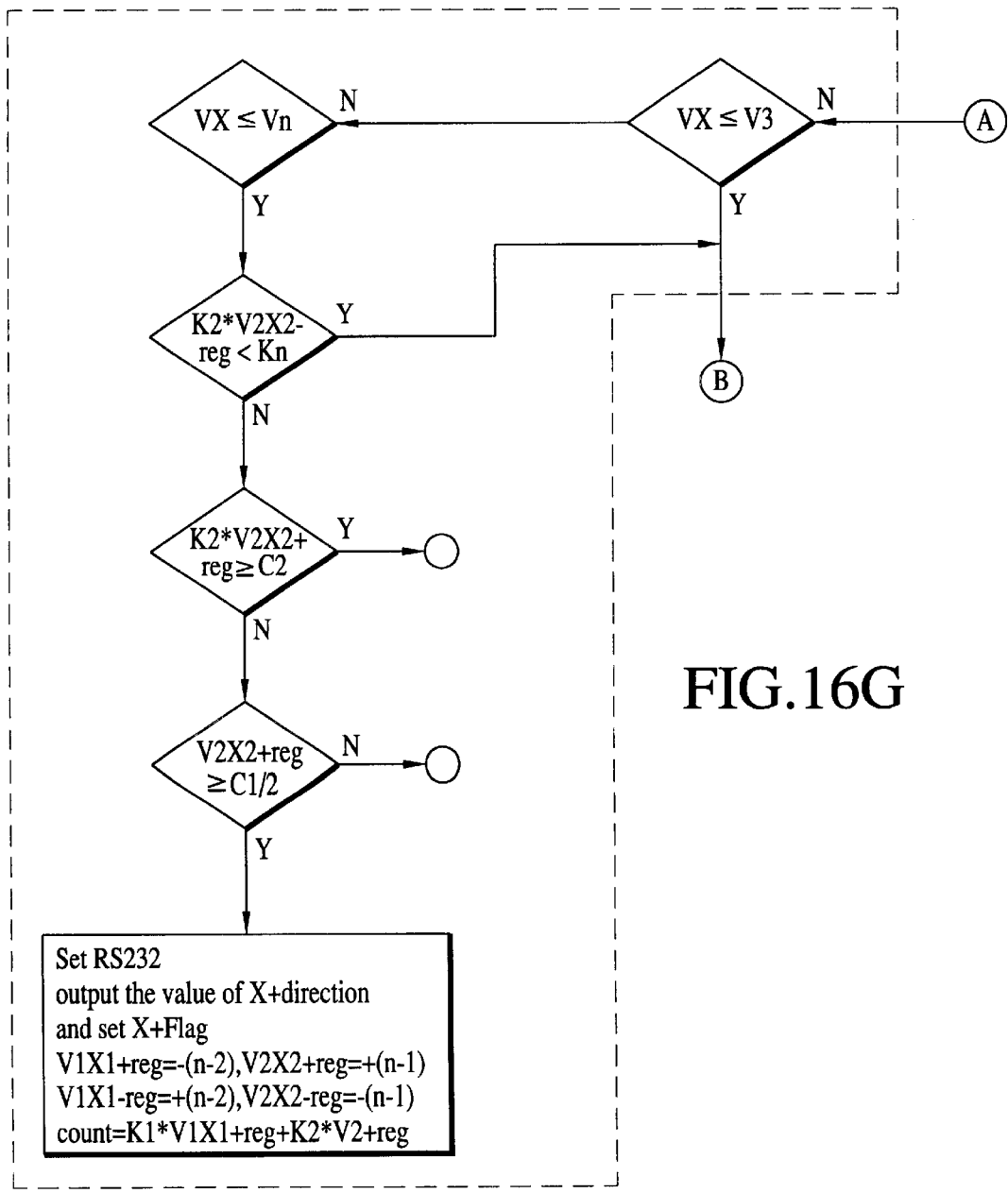
Figure 16H:
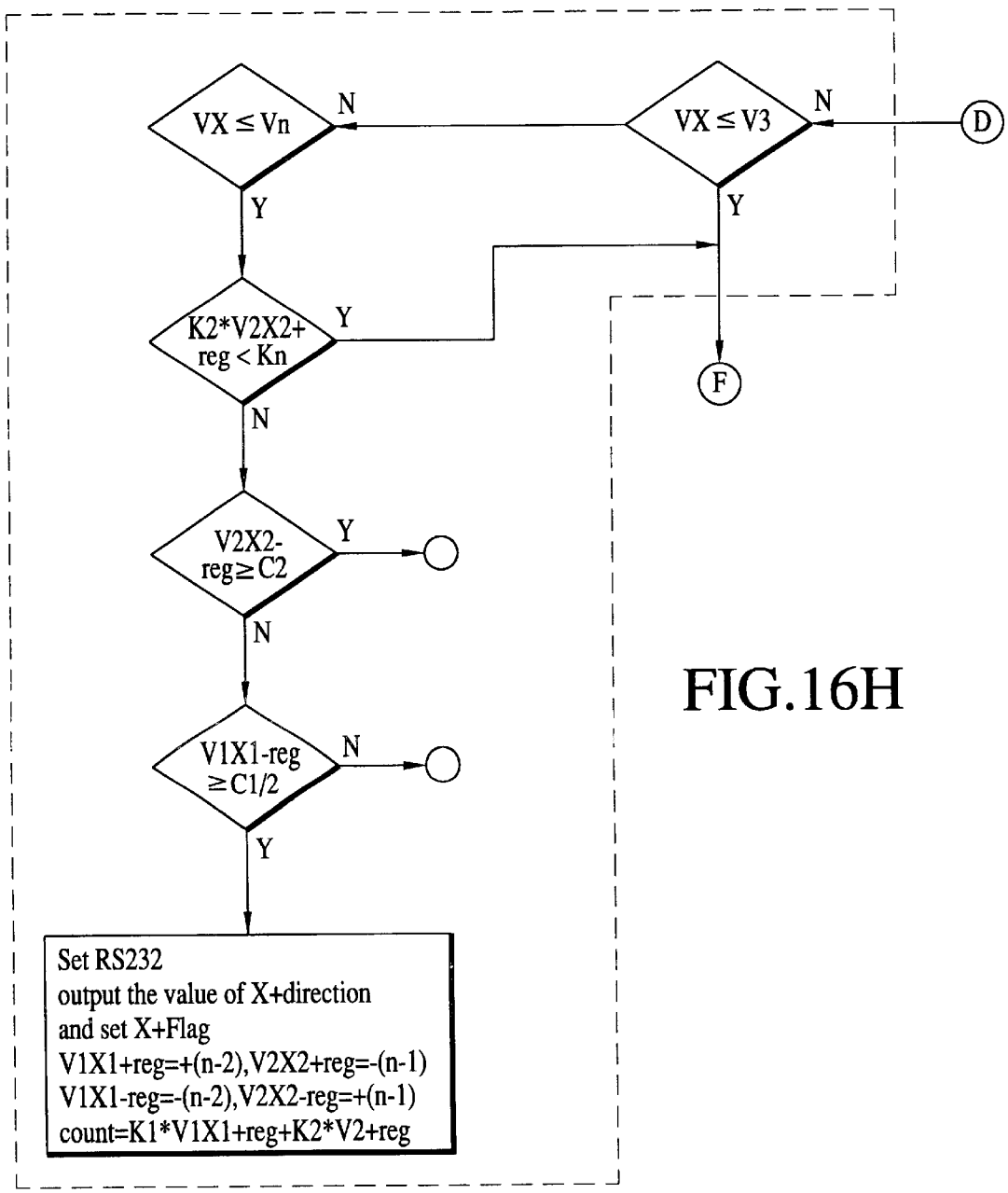
Figure 16I:
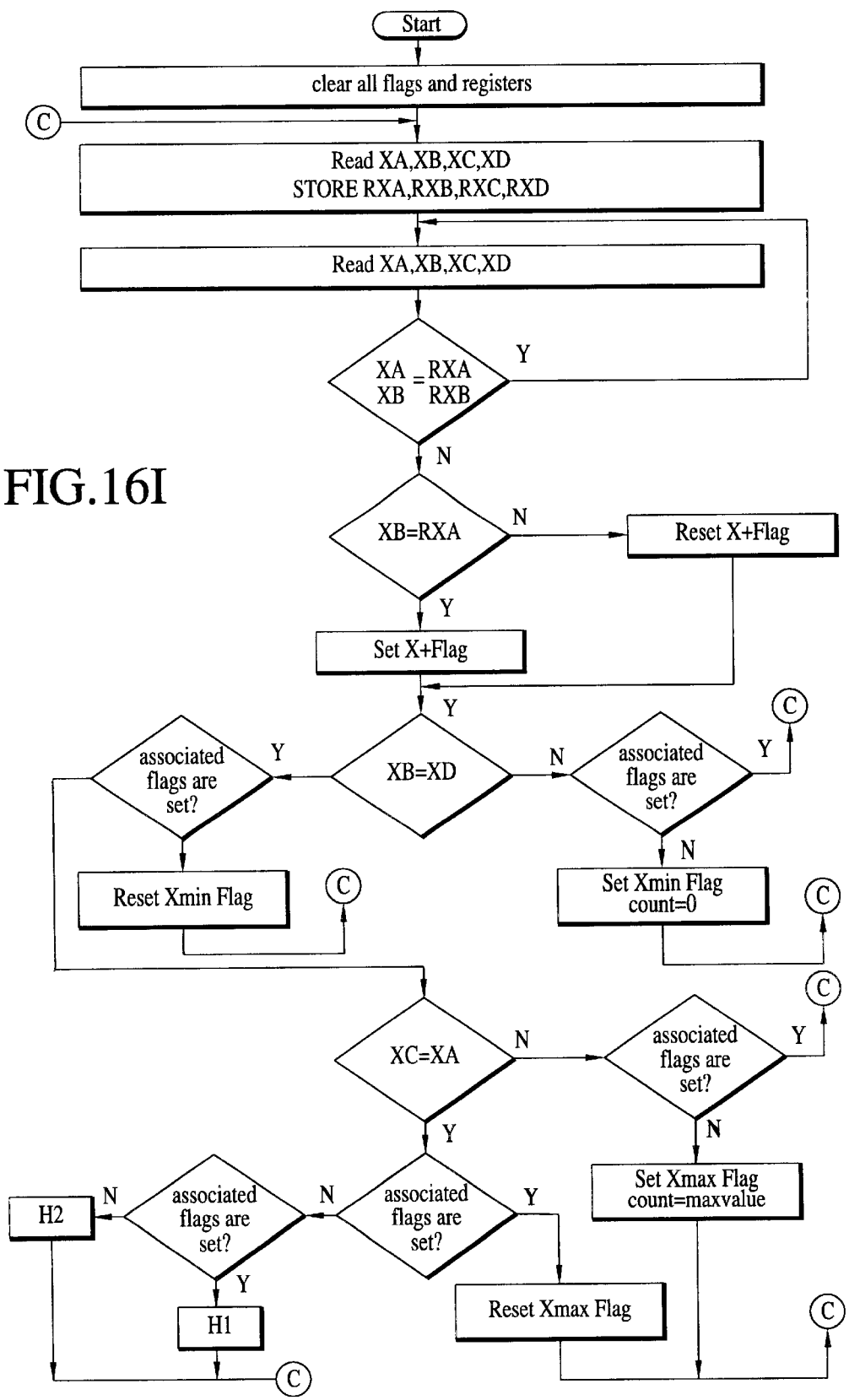

FIG. 16G is a subprogram flow chart of the Vx of a positive finger controllable element having a plurality of speed levels. The A and B thereof are connected to corresponding A and B of FIG. 16D. Therefore, if the result in step F44 is no, the procedure performs the step F61 of FIG. 16G; and if the result in step F61 is yes, the procedure performed the step F47 of FIG. 16D, in the step the speed VX in positive direction uses the same control procedure as that in the third speed level, the forth speed level, etc. In step F63, whether the cursor is over the boundary of the display is judged. If yes, the speed will be changed to a lower speed level to further judge whether the cursor exceeds the boundary again, The next step F64 is performed only until the cursor does not exceed the margin. In step F64, it judges whether the register V2X2+reg is a maximum value. If yes, the procedure returns to step F43; if no, the procedure performs the step 65. In step F65, it judges whether the register V1X1+reg is larger than a half of the value C1. If no, the step 46 is performed; if yes; if returns to step F66, and the high speed value of the finger controllable element (i.e. the third speed level or higher speed) is converted into values X2X2+ and V1X1+, and then recorded the values into the registers V2X2+reg and V1X1+reg respectively. In consequence, the speed and position of the cursor on display may match that of the finger controllable element with the advantages of smooth, steady, and precise positioning effect. FIG. 16H is a flow diagram in the negative direction, the operating theory thereof is similar to that of FIG. 16G.

The Y-axis procedure may follow that of the X-axis procedure with similar control flow described hereinabove.

Accordingly, by using the detecting of hardware and the judgment about the boundary which is different form that in FIG. 16A–C, the boundary judgment may be performed by a plurality of signals on the optic sensing set 3 by the lattice on the two sides of the active optic grids.

Figure 18:
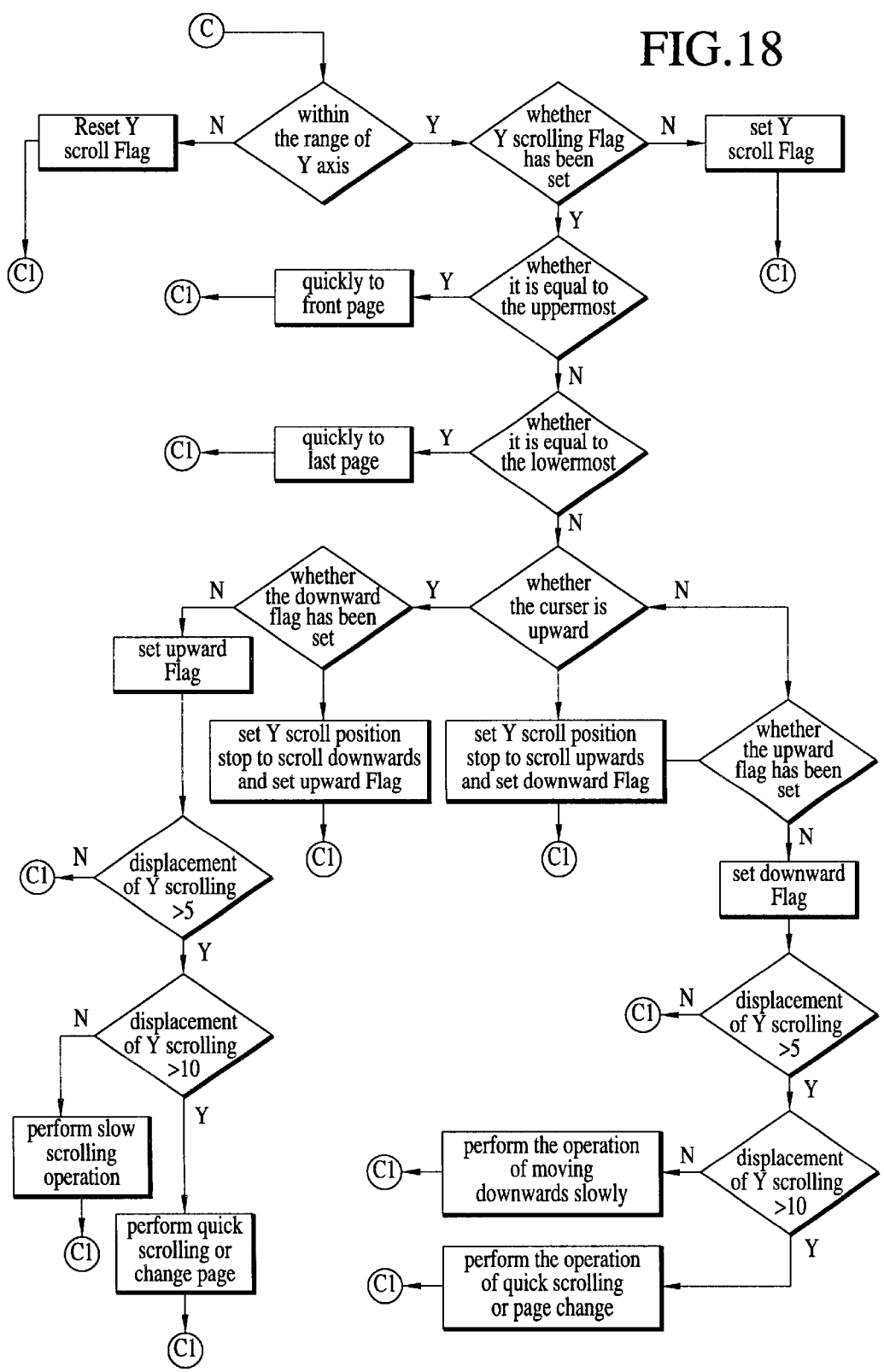
FIG. 18 is a flow diagram of the second operation mode in the present invention.

Now referring to FIG. 18, it shows the control flow diagram of the present invention in the second controlling mode, wherein said actuated step C and C1 is the same as the indications of C and C1 in FIG. 16. At first, it is judged whether the boundary of the finger controllable element has been within the range of the Y scroll in the second operating mode, if no, the Y scroll is rearranged, and the flag flow is returned to C1, if yes, then the procedure is further judged whether the Y scroll is set, if the Y scroll has not been set, then the Y flag represents that the finger controllable element is just into said second operating mode and the scrolling operation has not been performed. After the Y scroll is set, the procedure will return to C1, otherwise, if the Y scroll has been set, it represents that the finger controllable element has been in the second operating mode, and now the scroll operation will be performed. Thus, next, the procedure judges whether said finger controllable element is on the uppermost or lowest of said display, if yes, the operation for performing the second operating mode is switched to the operation of the page changing of said display so that the display is changed to the previous page or next page; alternatively, if said finger controllable element is on the uppermost or lowest of said display, then the procedure further judges whether the position selected by said Y scroll has been changed? If the answer is yes, then it judges whether the Y scroll is moved upwards or downwards. In the flow diagram, the procedure is divided into to parts, one part is used for describing the downward flow and the other part is used for describing the upward flow, therefore, only one part is described hereinafter, for example, if the Y scroll is moved upwards, then the procedure judges whether the downward flag has been set? if said flag has been set, it represent that originally the finger controllable element is move downwards, thus the current upward movement is a negative message, therefore, the Y scroll must be stopped for scrolling, and the upward flag is set, then the procedure is returned to C1. However, if the upward flag has not been set originally, then the procedure considers that the Y scroll is initially moved upwards, thus the upward flag is indicated, and then it judges whether the distance about the movement of Y scroll is within the range of 5 to 10 lattices, if the movement is smaller than 5 lattices, then the scrolling operation will not be performed and the procedure returns to C1 for preventing that the reaction is too sensitive so that a little vibration of human hands will induce errors; another, if the moving distance is smaller than ten lattices, the slow speed scrolling is performed; while if the moving distance is greater than ten lattices, then the fast scrolling or page change mode is performed, and then the procedure returns to C1. Therefore, after the Y scroll has moved upwards for a period of time, if an inverse operation is indicated, since the lower part of said procedure has no preset upwards indication, the second operation mode is stopped, and then the cursor is restored to absolute coordinate condition of the first operating mode.

In the following, a practical application is described in order to proof that the moving range of the finger controllable element of the present invention may be within the area with a length of 0.5 inch. As shown in FIG. 12, for example, if the resolution of X axis is 1280, assume K1=1, K2=5, and K3=10 for programming three different kinds of speeds which are proportional to the moving point of the display, wherein: the number of grids with respective to the moving of X axis and finger controllable element Y axis under the first operating mode may be induced as the following:

X axis 1280=(1×C1)+(5×C2)+(10×C3)=(1×20)+(5×20)+(10×116)
∴C1=20, C2=20, C3=116 C1+C2+C3=156 C Y axis 1024=(1×C1)+(5×C2)+(10×C3)=(1×19)+(5×21)+(10×90)
∴C1=19, C2=21, C3=90 C1+C2+C3=130 C Thus, the grid number of the X axis and Y axis under the first operating mode are equal to C1+C2+C3 which are 156 and 130, respectively. Besides, in order to practice the second operating mode of the present invention, the walking space of 25 grids is needed to add on said boundary in order to match the requirement of the second operating mode, in consequence, the practical number of illuminated grids is:

X axis is equal to 25+156+25=206 grids

Y axis is equal to 25+130+25=180 grids

Now assuming the minimum moving distance of the human hand is 0.06 mm, i.e. the current used 400 DPI in one inch, wherein the programming distance for each grid is:

25.4 mm/400~0.06 mm thus the length of illuminated grid operated is:

X axis=200×0.06=12.36 mm which is smaller than a half inch (12.52 mm)

Y axis=180×0.06=10.8 mm which is smaller than a half inch (12.52 mm)

From the aforementioned description, it is appreciated that by the technique of the present invention, the moving range of the present invention is substantially designed within an area of 0.5 inch so to match the requirement for moving by hand, and within such a finite range the absolute coordinate method may be performed so as to correspond with the whole display, and the automatic scroll as well as the function of fast moving to the boundary may be programmed, another, the design device has a small volume and is sealed tightly so to prevent dust and water, and in usage it will hinder the action of hands, therefore, the defect in the prior art, such as large volume and the ill positioning in usage, may be improved. Thus the present invention can be will used in the industry.

The aforementioned description is aimed at the preferred embodiment of the present invention. In the information carrier of the present invention, the optic grid pieces 21 and 22 is performed with the sensing sets 31 and 32 of the reading set, wherein the information signals "0" and "1" is generated by the transparency and non-transparency of the light and dark lattices installed on the optic grid pieces 21 and 22. However, in the same structure and object, the information carrier may has the following different types:

For example, the information carrier may be reset as magnetic disk or the magnetic tapes are adhered on the outer ring portion, while on the periphery of the magnetic disk, or the spacings on the peripheral magnetic tape is installed with S and N polarizations, therefore, by the reading set formed by Hall components or magnetic resistor sensor, similarly, the information signals "0" and "1" may be identified.

If the information carrier is changed to be a touch pad, and the resistor layer with different frequencies are recorded on the spacer of the circumference, further, electric connections are used as reading set so that different high or low voltages are generated in moving, thus the information signals "0" and "1" may also be identified.

If the information carrier is changed to be a CD Rom, and the digital signals with different frequencies are recorded on the spacer of the circumference so that the movement may be detected by the reading head of the reading set, thus the information signals "0" and "1" may also be identified.

If the information carrier is changed to be an optic-shifting reflecting mirror, and the textures with different refraction index are recorded on the spacer of the circumference, further, optic sensors are used as reading set so that the conditions of having light illumination or having no light illumination are generated in moving, thus the information signals "0" and "1" may also be identified.

While the present invention has been described with reference to the illustrative embodiment, this description is not intended to be construed in a limited sense. Various modifications of the illustrative embodiment of the invention, will be apparent to those skilled in the art on reference to this description. It is therefore completed that the appended claims will cover any such modifications or embodiments as fall within the true scope of the invention.

TABLE I

|  | 1 | 2 | 3 | 4 |
|---|---|---|---|---|
| XA | 0 | 1 | 1 | 0 |
| XB | 0 | 0 | 1 | 1 |
| X+ direction |  |  |  |  |
| XA | 1 | 1 | 0 | 0 |
| XB | 0 | 1 | 1 | 0 |
| X− direction |  |  |  |  |
| XA | 0 | 0 | 1 | 1 |
| XB | 1 | 0 | 0 | 1 |
| Xmax | 1 |  |  |  |
|  | 1 |  |  |  |
| Xmin |  |  | 0 |  |
|  |  |  | 0 |  |

Flag: Xman · Xmin · X+
Register:
Xreg · X+reg · X−reg · Xmax reg · Xmin reg
Y+reg + Y−reg

TABLE II

VX: the operating speed of the finger controllable element, and also provides a predetermined value as a reference value for speed determination. V(n) represents the different moving speed of the finger controllable element and the setting of speed level reference value.

C1: maximum displacement of the finger controllable element at minimum speed level.

C2: maximum displacement of the finger controllable element at second speed level.

C: combined displacement of the finger controllable element, in which C1+C2=C.

K(n): various reference constants at different speed level and the mutual relationship of various speeds of the finger controllable element.

V(n)X(n): displacement of the finger controllable element at different speed level.

V1X1+reg: a register for registering the displacement of the finger controllable element in positive direction at lowest speed level.

V2X2+reg: a register for registering the displacement of the finger controllable element in positive direction at the second speed level.

V1X1-reg: a register for registering the displacement of the finger controllable element in negative direction at lowest speed level.

V2X2-reg: a register for registering the displacement of the finger controllable element in negative direction at the second speed level.

TABLE III formula 1. C1+C2=C formula 2. Kn=(n−1)K2−(n−2)K1 n≧3, K2>K1 formula 3. (K×C1)+((K2×C2)=display distance formula 4. Kn×VnXn=K2×V2X2+K1×V1X1 display value formula 5. VnXn=V2X2+V1X1 the moving distance of the finger controllable element

What is claimed is:

1. A cursor controlling device, in which the cursor controlling device is used to control a displacement and location of a cursor on a computer display, said cursor controlling device comprising:

a case which is comprised of an upper piece and a lower piece, a cavity being formed between the upper piece and the lower piece;

an information carrier set within said case and having at least two information carriers for recording information signals used to identify "0" and "1", so as to record two dimensional movement of said cursor controlling device along an X axis and a Y axis;

a reading set installed within the case for coupling with said information carrier to drive the "0" and "1" signals corresponding to said two dimensional movement of said cursor controlling device;

a sliding bar set having at least an X axis sensor and a Y axis sensor set for driving said information carrier, respectively, bars of said sliding bar set being slidable relative to said case, wherein said installed information carrier is serially and actively connected to a portion of said case, and each of said information carriers has a driving portion which is projected to the external side of said case in order to be driven by the respective sliding bar set, whereby an assembled volume of said cursor controlling device is reduced to a minimum value so that the cursor controlling device may be moved within a very small area to control movement of the cursor on the display.

2. A cursor controlling device, comprising:

a case which is comprised of an upper piece and a lower piece, a cavity being formed between the upper piece and the lower piece;

an information carrier set within said cavity and having at least two information carriers for recording information signals used to identify "0" and "0" so as to associate movement of said cursor controlling device with an X axis and a Y axis;

a reading set installed within the case for coupling with information carriers to derive the "0" and "1" signals;

a sliding bar set having at least an X axis and a Y axis sensor set for driving said information carrier, respectively, bars of said sliding bar set being slidable relative to said case;

wherein said installed optic sensing set are serially and actively connected to a portion of said case and are overlapped with each other, each of said information carriers having a driven portion for being driving by said sliding bar, said driven portion being within said case, and the outer surface of said case being installed with a notch so that the sliding bar set may pass therethrough, whereby an assembled volume of said cursor controlling device is reduced to a minimum value so to the cursor controlling device may be moved within a very small area to control movement of the cursor on the display.

3. The cursor controlling device as claimed in claim 1 or 2, wherein a frame is installed on said device with respect to said sliding bar set, two sides of the frame are installed with sliding grooves which are parallel to X axis, and the other sides thereof are installed with sliding grooves which are parallel to Y axis so that the sliding bar set may be slid on the sliding grooves.

4. A cursor controlling device, in which the cursor controlling device is used to control displacement and location of a cursor on a computer display, the cursor controlling device comprising:

a case which is comprises of an upper piece and a lower piece, a cavity being formed between the upper piece and the lower piece;

an information carrier set within said cavity and having at least two information carriers for recording information signals used to identify "0" and "1" so as to associate movement of said cursor controlling device with an X axis and a Y axis;

a reading set installed within the case for coupling with information carriers to derive the "0" and "1" signals;

a sliding bar set having at least an X axis and a Y axis sensor set for driving said information carrier, respectively, bars of said sliding bar set being slidable relative to the case;

wherein said information carriers are connected in parallel to a portion of said case, while the upper piece and the lower piece of said case is constructed by a frame and a plate body, and the frame is installed with a sliding bar moving area, and a plurality of holes are installed on said plate body for positioning said two information carriers in parallel; whereby the assembled cursor controlling device is reduced to a minimum volume so to the cursor controlling device may be moved within a very small area to control movement of cursor moving the display.

5. The cursor controlling device as claimed in claim 4, wherein controlling keys are installed on the plate body of said upper piece, walking tracks of the sensor set are installed on two sides of the frame of said upper piece, a concave mouth is installed on the frame of said lower piece for being passed by another sliding bar, and the plate body of said lower piece is a circuit board the bottom of which is installed with a pillar inserted into a hole of a bottom plate so that the sliding bar set within said case and said information carrier set may rotated through an intended angle.

6. The cursor controlling device as claimed in claim 1 or 2 or 4, wherein said information carriers each has a circular shape and is driven by a gear which is connected with the center of said circular shape, a long hole is installed on a middle portion of said sliding bar, and a rack is installed within said hole for directly engaging the gear for driving said information carriers.

7. The cursor controlling device as claimed in claim 1 or 2 or 4, wherein said information carriers are include media selected from the group consisting of optic grid pieces, magnetic disk, magnetic tapes, optic disks, touch pads, optic shift reflector, and combinations of said media.

8. The cursor controlling device as claimed in claim 1 or 2, wherein each said information carrier is an optic grid piece, said reading set is an optic sensing set, bright and dark lattices installed on each of the information carriers are located on different circumferences, and at least a portion of said optic grid piece is transparent, the receiving portion and illuminating portion of the optic sensing set being installed on the upper and lower sides of said case, respectively, and the optic sensing set corresponds to different said bright and dark lattices for reading a message thereon.

9. The cursor controlling device as claimed in claim 8, wherein a small gear is installed on one of the information carriers, and a long shaft is installed below and connected with said small gear, while a short shaft is installed on another end of said information carrier piece, a large gear is installed on another said information carrier piece, a short shaft is connected with and installed below said large gear, and a penetrating hole is included at the center of said short shaft for penetration by the long shaft of the small gear.

10. The cursor controlling device as claimed in claim 8, wherein each of the two information carriers is installed with a central hole through which a middle shaft extends to connect the information carriers, and an expanding portion is installed at a central portion of said middle shaft for spacing the two information carriers.

11. The cursor controlling device as claimed in claim 8, wherein a driving portion of each information carrier is a purely hollow axis body, and respective ropes are installed on the sliding bar sets, whereby when the ropes are combined, central portions thereof extend around the hollow axial bodies of the information carriers, while two ends of the ropes are attached to the sliding bar set for fixing the ropes so that the information carriers are driven to rotate by movement of the sliding bar sets.

12. The cursor controlling device is claimed in claim 8, wherein said case has a rectangular shape, and the sensor sets are installed at opposite corners of said case.

13. The cursor controlling device as claimed in claim 7, wherein said device is installed on one of the keyboards, remote controllers, operating panel of notebook computers, and computer mice.

14. A cursor controlling device, in which the cursor controlling device is used to control displacement and location of a cursor on a computer display, said cursor controlling device comprising:

a case which is a finger controllable element;

at least one circular optic piece and a respective reading set for generating signals of 0 and 1, and for reading data about movement of the finger controllable element; and at least one register for recording the length values of the signals 0 and 1 generated by optic grid pieces, said device having a single operating mode for detecting said movement of the finger controllable element using at least two sets of different ratio constants to multiply a moving distance of the finger controllable element according to a variation in moving speed of the finger controllable element, and thereby controlling a moving distance of the cursor among the display screen to be positively proportional to the respective rotational distance of the finger controllable element.

15. The cursor controlling device as claimed in claim 14 wherein there are two respective sets of optic grid pieces, one for detecting movement along the X axis and the other for detecting movement along the Y axis, and at least two registers are installed for each of the axes, and wherein the single operating mode presets a constant C according to the sum of the number of the signals 0 and 1 which could be generated in each axis and divides the constant C into a low speed section C1 and a plurality of high speed sections C2,..., Cn, wherein each of the low and high speed sections C1,C2, ..., Cn is correspondent to respectively different moving ratios K1,K2, ..., Kn, taking the sum of the multiplies of the respective speed sections and the moving ratios C1K1+C2K2+...+CnKn to the resolution of the respective display screen, and further using the at least two registers to record the moving lattice numbers of the low speed section C1 and the high speed section C2, respectively, the sum of all registers being equal to the constant C of each said axis.

16. The cursor controlling device as claimed in claim 15, wherein in said single operating mode, as the moving speed of the finger controlling element is over the low speed, the register with respect to the high speed section C2 is increased by at least a number N−1, and another register with respect to the low speed section C1 is reduced by at least N−2, thereby keeping the total moving value fixed to 1, wherein N≧2.

17. A cursor controlling method, comprising the steps of:
(a) providing a cursor controlling device for detecting movement of a finger and generating digital data;
(b) setting ratio constants K1, K2, Kn; setting maximum values C1, C2, Cn and initial values V1X1, V2X2, VnXn of respective registers corresponding to different speed sections, wherein a number of said registers is n and n>=2;
(c) receiving digital data sent from the cursor controlling device;
(d) determining the speed of the data and which speed section the data corresponds to for each coordinate axis;
(e) adding the data value to the register corresponding to said speed section; and
(f) positioning the cursor based on the sum of the multiples of the respective ratio constants and values in said registers as display values, i.e., K1*V1X1+ K2*V2X2+ Kn*VnXn.

18. A cursor controlling method as claimed in claim 17, wherein step (e) comprises the step of adding the data value to the register until a resultant value is at least equal to the maximum value and adding a remainder value to the other registers in any order.

19. A cursor controlling method as claimed in claim 17 or 18, further comprising the step of causing a data value in registers V1X1 approach to C1/2 when the speed of receiving data is within the higher speed section for each axis.

20. A cursor controlling method as claimed in claim 19, wherein the step is causing a data value in register V1X1 to approach C1/2 by adding N to register V1X1 while subtracting N from the registers responding to higher speed section, wherein N is integer.

21. A cursor controlling method comprising the steps of:
(a) providing a cursor controlling device for detecting movement of a finger and generating digital data;
(b) setting ratio constants K1, K2, Kn; setting maximum values C1, C2, Cn and initial values V1X1, V2X2, VnXn of respective variables corresponding to different speed sections, wherein a number of said registers is n and n>=2;
(c) receiving digital data sent from the cursor controlling device;
(d) determining the speed of the data and which speed section the data corresponds to for each coordinate axis;
(e) adding the data value to the variable corresponding to said speed section; and
(f) positioning the cursor based on the sum of the multiples of the respective constants and variables as display values, i.e., K1*V1X1+K2*V2X2+ Kn*VnXn.

\* \* \* \* \*